(12) United States Patent
Wietfeldt et al.

(10) Patent No.: US 9,155,103 B2
(45) Date of Patent: Oct. 6, 2015

(54) COEXISTENCE MANAGER FOR CONTROLLING OPERATION OF MULTIPLE RADIOS

(75) Inventors: Richard D. Wietfeldt, San Diego, CA (US); George Chrisikos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 938 days.

(21) Appl. No.: 12/549,651

(22) Filed: Aug. 28, 2009

(65) Prior Publication Data
US 2010/0304770 A1 Dec. 2, 2010

Related U.S. Application Data

(60) Provisional application No. 61/182,946, filed on Jun. 1, 2009.

(51) Int. Cl.
| | | |
|---|---|---|
| *H04B 17/00* | (2006.01) | |
| *H04W 72/12* | (2009.01) | |
| *H04W 88/06* | (2009.01) | |

(52) U.S. Cl.
CPC ...... *H04W 72/1215* (2013.01); *H04W 72/1231* (2013.01); *H04W 88/06* (2013.01)

(58) Field of Classification Search
USPC .......................... 455/553.1, 68; 370/465, 252
See application file for complete search history.

(56) References Cited

U.S. PATENT DOCUMENTS

| | | | |
|---|---|---|---|
| 4,933,845 A | 6/1990 | Hayes | |
| 5,486,210 A | 1/1996 | Kerr et al. | |
| 5,726,893 A | 3/1998 | Schuchman et al. | |
| 6,128,483 A | 10/2000 | Doiron et al. | |
| 6,571,285 B1 | 5/2003 | Groath et al. | |
| 6,944,430 B2 | 9/2005 | Berstis | |

(Continued)

FOREIGN PATENT DOCUMENTS

| | | |
|---|---|---|
| CN | 1449601 A | 10/2003 |
| CN | 1475064 A | 2/2004 |

(Continued)

OTHER PUBLICATIONS

International Search Report and Written Opinion—PCT/US2010/036873, International Search Authority—European Patent Office—Sep. 16, 2010.

(Continued)

*Primary Examiner* — April G Gonzales
(74) *Attorney, Agent, or Firm* — Rupit M. Patel

(57) ABSTRACT

Techniques for performing radio coexistence management to control operation of multiple radios to achieve good performance are described. In one design, an entity (e.g., a coexistence manager or a radio controller) may receive inputs from one or more radios among multiple radios operating concurrently. An input from a radio may indicate a planned operating state or planned activity of the radio in an upcoming time interval. The entity may determine controls for at least one radio based on the received inputs and a database of performance versus operating states to mitigate interference caused or observed by each of the at least one radio. The control for a radio may indicate a selected operating state or selected setting for at least one configurable parameter for the radio in the upcoming interval. The entity may send the controls to the at least one radio. Each radio may operate in accordance with its control.

53 Claims, 14 Drawing Sheets

(56) References Cited

U.S. PATENT DOCUMENTS

| | | | |
|---|---|---|---|
| 7,035,314 B1 | 4/2006 | Linsky | |
| 7,317,900 B1 | 1/2008 | Linde et al. | |
| 7,324,815 B2 | 1/2008 | Ross et al. | |
| 7,339,446 B2 | 3/2008 | Su et al. | |
| 7,412,250 B2 | 8/2008 | Fukuda | |
| 7,433,970 B1 | 10/2008 | Euler et al. | |
| 7,440,728 B2 | 10/2008 | Abhishek et al. | |
| 7,454,171 B2 | 11/2008 | Palin et al. | |
| 7,623,879 B2 * | 11/2009 | Honkanen et al. | 455/501 |
| 7,685,325 B2 | 3/2010 | Batchelor et al. | |
| 7,786,755 B2 | 8/2010 | Yao et al. | |
| 7,903,642 B2 | 3/2011 | Voutilainen et al. | |
| 7,929,432 B2 * | 4/2011 | Zhu et al. | 370/229 |
| 7,990,882 B1 | 8/2011 | Bedair et al. | |
| 7,990,992 B2 | 8/2011 | Muukki et al. | |
| 8,059,553 B2 * | 11/2011 | Leung et al. | 370/252 |
| 8,060,085 B2 | 11/2011 | Goulder et al. | |
| 8,089,888 B2 | 1/2012 | Krishnamurthi et al. | |
| 8,095,176 B2 | 1/2012 | Sudak | |
| 8,184,154 B2 | 5/2012 | Estevez et al. | |
| 8,340,706 B2 * | 12/2012 | Zetterman et al. | 455/515 |
| 8,660,548 B1 * | 2/2014 | Lambert | 455/418 |
| 2002/0080728 A1 | 6/2002 | Sugar et al. | |
| 2002/0129184 A1 | 9/2002 | Watanabe | |
| 2002/0167963 A1 | 11/2002 | Joa-Ng | |
| 2003/0135675 A1 | 7/2003 | Pontius et al. | |
| 2003/0139136 A1 * | 7/2003 | Pattabiraman | 455/41 |
| 2003/0231741 A1 | 12/2003 | Rancu et al. | |
| 2004/0022210 A1 | 2/2004 | Frank et al. | |
| 2004/0023674 A1 | 2/2004 | Miller | |
| 2004/0028003 A1 | 2/2004 | Diener et al. | |
| 2004/0028123 A1 | 2/2004 | Sugar et al. | |
| 2004/0029619 A1 | 2/2004 | Liang et al. | |
| 2004/0052272 A1 | 3/2004 | Frank | |
| 2004/0137915 A1 | 7/2004 | Diener et al. | |
| 2004/0192222 A1 | 9/2004 | Vaisanen et al. | |
| 2004/0259589 A1 | 12/2004 | Bahl et al. | |
| 2005/0047038 A1 | 3/2005 | Nakajima et al. | |
| 2005/0099943 A1 | 5/2005 | Naghian et al. | |
| 2005/0239497 A1 | 10/2005 | Bahl et al. | |
| 2005/0277387 A1 | 12/2005 | Kojima et al. | |
| 2005/0289092 A1 | 12/2005 | Sumner et al. | |
| 2006/0013176 A1 | 1/2006 | De et al. | |
| 2006/0025181 A1 | 2/2006 | Kalofonos et al. | |
| 2006/0026051 A1 | 2/2006 | Rose | |
| 2006/0089119 A1 | 4/2006 | Lipasti et al. | |
| 2006/0101033 A1 | 5/2006 | Hu et al. | |
| 2006/0126702 A1 | 6/2006 | Burdett | |
| 2006/0152335 A1 | 7/2006 | Helgeson | |
| 2006/0160563 A1 * | 7/2006 | Ku | 455/552.1 |
| 2006/0166628 A1 | 7/2006 | Anttila | |
| 2006/0233191 A1 | 10/2006 | Pirzada et al. | |
| 2006/0292986 A1 | 12/2006 | Bitran et al. | |
| 2007/0105548 A1 | 5/2007 | Mohan et al. | |
| 2007/0124005 A1 | 5/2007 | Bourakov et al. | |
| 2007/0125162 A1 | 6/2007 | Ghazi et al. | |
| 2007/0135162 A1 | 6/2007 | Banerjea et al. | |
| 2007/0153702 A1 | 7/2007 | Khan et al. | |
| 2007/0165754 A1 | 7/2007 | Kiukkonen et al. | |
| 2007/0206631 A1 * | 9/2007 | Parts et al. | 370/465 |
| 2007/0232349 A1 | 10/2007 | Jones et al. | |
| 2007/0248114 A1 | 10/2007 | Jia et al. | |
| 2007/0255850 A1 | 11/2007 | Gould et al. | |
| 2007/0281617 A1 | 12/2007 | Meylan et al. | |
| 2008/0019339 A1 | 1/2008 | Raju et al. | |
| 2008/0045152 A1 | 2/2008 | Boes | |
| 2008/0057910 A1 | 3/2008 | Thoresson et al. | |
| 2008/0066019 A1 | 3/2008 | Worek et al. | |
| 2008/0109581 A1 | 5/2008 | Pham et al. | |
| 2008/0130580 A1 | 6/2008 | Chaponniere et al. | |
| 2008/0161041 A1 * | 7/2008 | Pernu | 455/553.1 |
| 2008/0192806 A1 | 8/2008 | Wyper et al. | |
| 2008/0200120 A1 | 8/2008 | Ruuska et al. | |
| 2008/0227456 A1 | 9/2008 | Huang et al. | |
| 2008/0232339 A1 | 9/2008 | Yang et al. | |
| 2008/0254745 A1 | 10/2008 | Zhang et al. | |
| 2008/0279137 A1 | 11/2008 | Pernu et al. | |
| 2008/0279155 A1 | 11/2008 | Pratt, Jr. et al. | |
| 2008/0287158 A1 | 11/2008 | Rayzman et al. | |
| 2008/0298643 A1 | 12/2008 | Lawther et al. | |
| 2008/0311912 A1 | 12/2008 | Balasubramanian et al. | |
| 2009/0033550 A1 | 2/2009 | Wolf | |
| 2009/0040937 A1 * | 2/2009 | Xhafa et al. | 370/252 |
| 2009/0046625 A1 | 2/2009 | Diener et al. | |
| 2009/0061781 A1 | 3/2009 | Zhang | |
| 2009/0116437 A1 | 5/2009 | Alexandre et al. | |
| 2009/0116573 A1 | 5/2009 | Gaal et al. | |
| 2009/0137206 A1 | 5/2009 | Sherman et al. | |
| 2009/0149135 A1 | 6/2009 | Mangold et al. | |
| 2009/0176454 A1 | 7/2009 | Chen et al. | |
| 2009/0180451 A1 | 7/2009 | Alpert et al. | |
| 2009/0196210 A1 | 8/2009 | Desai | |
| 2009/0215404 A1 | 8/2009 | Kesavan et al. | |
| 2009/0239471 A1 | 9/2009 | Tran et al. | |
| 2009/0252053 A1 | 10/2009 | Leith et al. | |
| 2009/0252128 A1 | 10/2009 | Yang et al. | |
| 2009/0257380 A1 | 10/2009 | Meier | |
| 2009/0262785 A1 | 10/2009 | Wilhelmsson | |
| 2009/0303975 A1 * | 12/2009 | Xhafa et al. | 370/338 |
| 2009/0310501 A1 | 12/2009 | Catovic et al. | |
| 2009/0310661 A1 | 12/2009 | Kloper et al. | |
| 2009/0323652 A1 | 12/2009 | Chen et al. | |
| 2010/0085951 A1 | 4/2010 | Pernu et al. | |
| 2010/0130129 A1 | 5/2010 | Chang et al. | |
| 2010/0137025 A1 | 6/2010 | Tal et al. | |
| 2010/0141399 A1 | 6/2010 | Swope | |
| 2010/0142500 A1 | 6/2010 | Sudak | |
| 2010/0153760 A1 | 6/2010 | Gupta et al. | |
| 2010/0158037 A1 | 6/2010 | Heinke et al. | |
| 2010/0197235 A1 | 8/2010 | Wilhelmsson | |
| 2010/0203832 A1 | 8/2010 | Russell et al. | |
| 2010/0241727 A1 | 9/2010 | Bourakov et al. | |
| 2010/0273426 A1 | 10/2010 | Walley et al. | |
| 2010/0273504 A1 | 10/2010 | Bull et al. | |
| 2010/0304685 A1 * | 12/2010 | Wietfeldt et al. | 455/67.11 |
| 2010/0311455 A1 | 12/2010 | Armstrong et al. | |
| 2010/0316027 A1 | 12/2010 | Rick et al. | |
| 2010/0322287 A1 | 12/2010 | Truong et al. | |
| 2010/0329161 A1 | 12/2010 | Ylanen et al. | |
| 2010/0329162 A1 | 12/2010 | Kadous et al. | |
| 2010/0330977 A1 | 12/2010 | Kadous et al. | |
| 2010/0331029 A1 | 12/2010 | Linsky et al. | |
| 2011/0007680 A1 | 1/2011 | Kadous et al. | |
| 2011/0007688 A1 | 1/2011 | Veeravalli et al. | |
| 2011/0009136 A1 | 1/2011 | Mantravadi et al. | |
| 2011/0026432 A1 | 2/2011 | Gruber et al. | |
| 2011/0026458 A1 | 2/2011 | Gruber et al. | |
| 2011/0065402 A1 | 3/2011 | Kraft et al. | |
| 2011/0105027 A1 | 5/2011 | Linsky | |
| 2011/0116490 A1 | 5/2011 | Wilhelmsson et al. | |
| 2011/0199989 A1 | 8/2011 | Wietfeldt et al. | |
| 2011/0212288 A1 * | 9/2011 | McClure et al. | 428/67 |
| 2011/0249603 A1 | 10/2011 | Rick et al. | |
| 2011/0312288 A1 | 12/2011 | Fu et al. | |
| 2011/0317565 A1 | 12/2011 | Krishnamurthi et al. | |
| 2012/0034870 A9 | 2/2012 | Desai et al. | |
| 2012/0129457 A1 | 5/2012 | Linsky | |
| 2012/0213303 A1 | 8/2012 | Kadous et al. | |
| 2012/0230303 A1 | 9/2012 | Guo et al. | |
| 2012/0270595 A1 | 10/2012 | Yang et al. | |

FOREIGN PATENT DOCUMENTS

| | | |
|---|---|---|
| CN | 1592088 A | 3/2005 |
| CN | 1666189 A | 9/2005 |
| CN | 1689194 A | 10/2005 |
| CN | 1716900 A | 1/2006 |
| CN | 1741484 A | 3/2006 |
| CN | 1887018 A | 12/2006 |
| CN | 1893299 A | 1/2007 |
| CN | 101132368 A | 2/2008 |
| CN | 101170315 A | 4/2008 |
| CN | 101262254 A | 9/2008 |
| CN | 101361279 A | 2/2009 |

(56) References Cited

FOREIGN PATENT DOCUMENTS

| | | |
|---|---|---|
| CN | 101378355 A | 3/2009 |
| CN | 101453759 A | 6/2009 |
| DE | 19602535 C1 | 9/1996 |
| EP | 1220460 A2 | 7/2002 |
| EP | 1489788 A2 | 12/2004 |
| EP | 1551080 A1 | 7/2005 |
| EP | 1589781 | 10/2005 |
| EP | 1659814 A1 | 5/2006 |
| EP | 1681772 A1 | 7/2006 |
| EP | 1703675 A1 | 9/2006 |
| EP | 1705936 | 9/2006 |
| EP | 1729464 A1 | 12/2006 |
| EP | 1959619 | 8/2008 |
| EP | 2068452 | 6/2009 |
| GB | 2412817 A | 10/2005 |
| JP | S61110250 A | 5/1986 |
| JP | H05336141 A | 12/1993 |
| JP | H0721114 A | 1/1995 |
| JP | 08055495 | 2/1996 |
| JP | 9501814 A | 2/1997 |
| JP | 2003199160 A | 7/2003 |
| JP | 2003234745 A | 8/2003 |
| JP | 2003298598 A | 10/2003 |
| JP | 2004129143 A | 4/2004 |
| JP | 2005012815 A | 1/2005 |
| JP | 2005529549 A | 9/2005 |
| JP | 2005328520 A | 11/2005 |
| JP | 2006211242 A | 8/2006 |
| JP | 2007503733 A | 2/2007 |
| JP | 2007129711 A | 5/2007 |
| JP | 2007202176 A | 8/2007 |
| JP | 2007523519 A | 8/2007 |
| JP | 2008521309 A | 6/2008 |
| JP | 2008153984 A | 7/2008 |
| JP | 2008219444 A | 9/2008 |
| JP | 2009500988 A | 1/2009 |
| JP | 2009042887 A | 2/2009 |
| JP | 2009534972 A | 9/2009 |
| JP | 2010504677 A | 2/2010 |
| JP | 2010531565 A | 9/2010 |
| KR | 20040111157 A | 12/2004 |
| KR | 20060047429 A | 5/2006 |
| TW | I264209 B | 10/2006 |
| TW | 200820800 A | 5/2008 |
| TW | I309953 B | 5/2009 |
| WO | WO9422239 | 9/1994 |
| WO | 9527381 A1 | 10/1995 |
| WO | WO0230133 A2 | 4/2002 |
| WO | WO03105418 | 12/2003 |
| WO | WO2004006461 A1 | 1/2004 |
| WO | WO-2005062815 A2 | 7/2005 |
| WO | WO2007008981 | 1/2007 |
| WO | 2007063901 A1 | 6/2007 |
| WO | WO-2007083205 A2 | 7/2007 |
| WO | 2007122297 A1 | 11/2007 |
| WO | WO2007138375 | 12/2007 |
| WO | WO2008000905 | 1/2008 |
| WO | 2008024713 A2 | 2/2008 |
| WO | 2008041071 A2 | 4/2008 |
| WO | WO2008070777 | 6/2008 |
| WO | WO2010080669 | 7/2010 |
| WO | WO2011002795 A1 | 1/2011 |
| WO | WO2011006130 A1 | 1/2011 |
| WO | WO2011008557 A1 | 1/2011 |
| WO | WO2011061164 A2 | 5/2011 |

OTHER PUBLICATIONS

Baghel, et al., "Coexistence Possibilities of LTE with ISM Technologies and GNSS," IEEE, 2011 International Conference on Communications, Jan. 28-30, 2011. p. 1-5.

Bluetooth Sig, Inc. "Bluetooth Specification Version 3,0 + HS, Core System Package, Part B Baseband Specification", vol. 2 Apr. 21, 2009, pp. 68-85, XP002622397, Retrieved from the Internet: URL: http://www.bluetooth.com/Specification_%20Documents/Core_V30_HS.zip.

Coen Bron, et al., Algorithm 457: Finding All Cliques of an Undirected Graph, Communications of the ACM, 16(9): 575-577, 1973.

F. Cazals. C. Karande, A note on the problem of reporting maximal cliques, Theoretical Computer Science, vol. 407, Issues 1-3, Nov. 6, 2008, pp. 564-568.

Hong, et al., "Exploring multiple radios and multiple channels in wireless mesh networks [Accepted from Open Call]", IEEE Wireless Communications, IEEE Service Center, Piscataway, NJ, US, vol. 17, No. 3, Jun. 1, 2010, pp. 76-85, XP011311811, ISSN: 1536-1284.

Juha B., et al.,"Slimbus: An Audio, Data and Control Interface for Mobile Devices" Conference: 29th International Conference: Audio for Mobile and Handheld Devices; Sep. 2006, AES, 60 East 42nd Street, Room 2520 New York 10165-2520, USA, Sep. 1, 2006, XP040507958 Section 2.6.

Ramachandran, et al., "Interference-Aware Channel Assignment in Multi-Radio Wireless Mesh Networks", INFOCOM 2006, 25th IEEE International Conference on Computer Communications, Proceedsings, IEEE Piscataway, NJ, Apr. 1, 2006, pp. 1-12, XP031072217, DO1: 10.1109/INFOCOM.2006.177, ISBN: 978-1-4244-0221-2.

Stefan Geirhofer, et al., "Cognitive frequency hopping based on interference prediction: theory and experimental results" Mobile Computing and Communications Review, ACM, New York, NY, US LNKD-DOI: 10.1145/1621076.1621082, vol. 13, No. 2, Apr. 1, 2009, pp. 49-61, XP001555779, ISSN: 1091-1669.

dB or not dB? Everything you ever wanted to know about decibels but were afraid to ask . . . Application Note 1 MA98, Oct. 2005, Rohde & Schwarz, located at http:llwww2.rohde-schwarz.comlfile~561311M A98-4E.

Stefan, G., et al., "Congitive Frequency Hopping Based On Interference Prediction: Theory And Experimental Results", Mobile Computing and Communications Review, vol. 13, No. 2, pp. 49 to 51, Apr. 2009.

Taiwan Search Report—TW099117627—TIPO—Apr. 7, 2013.

\* cited by examiner

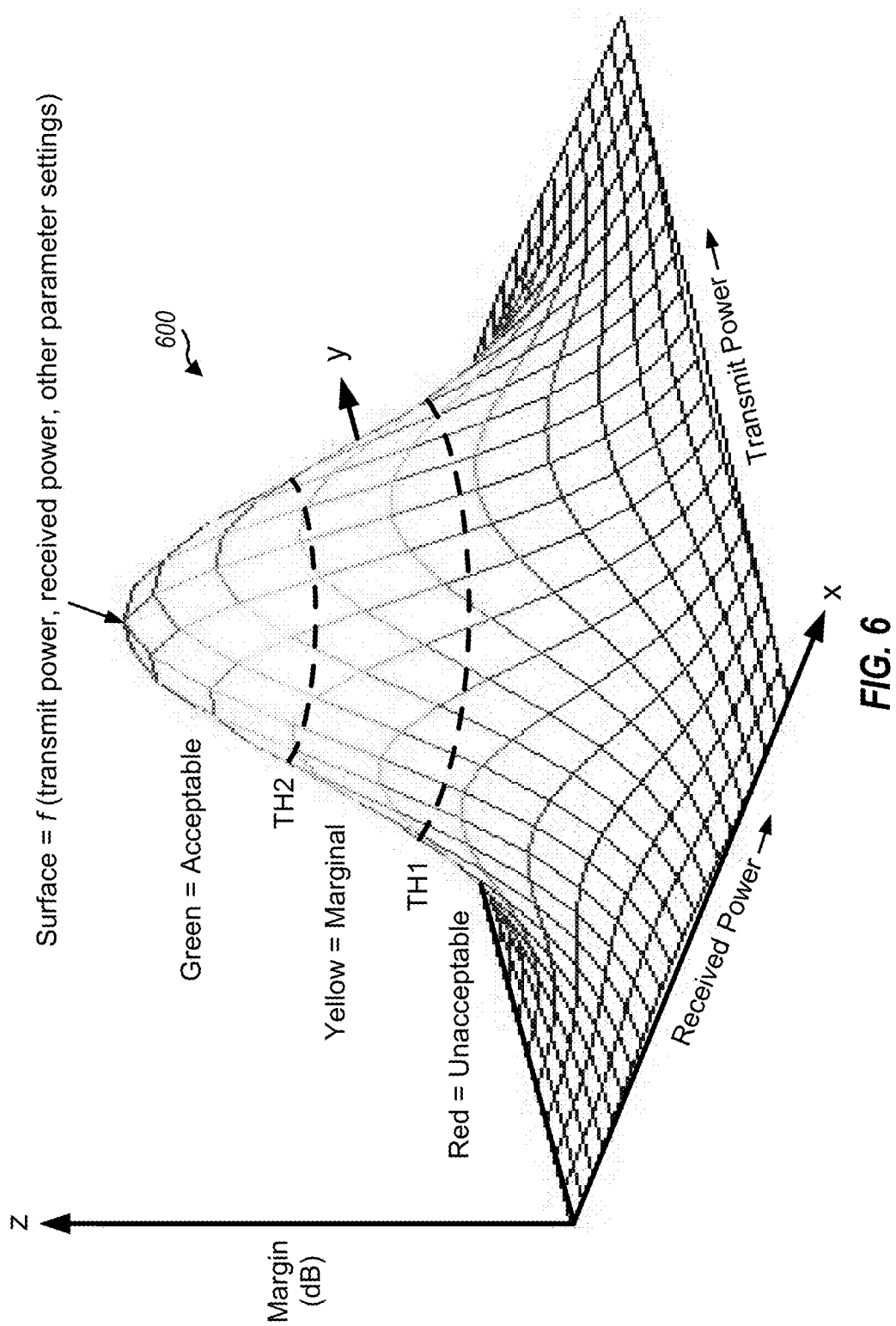

| | | | Transmitter Radio (Aggressor) | | | | | | | | | | | | | Radio Tech |
|---|---|---|---|---|---|---|---|---|---|---|---|---|---|---|---|---|
| | | | LTE/E-UTRA | | | | | | | | Bluetooth | | FM TX | | WLAN | | Freq |
| | | | 824-849 | | 2500-2570 | | 2570-2620 | | 2620-2690 | | 2400-2484 | | 88-108 | | 2400-2484 | | Scenario |
| | | | Sen | Nom | Sen | Nom | Sen | Nom | Sen | Nom | Sen | Nom | Sen | Nom | Sen | Nom | |
| | | Green | | | | | | | | | 100% | 100% | | | 100% | 100% | |
| | | Yellow | | | | | | | | | 0% | 0% | | | 0% | 0% | |
| 700 → | 2300-2400 | Red | | | | | | | | | 0% | 0% | | | 0% | 0% | |
| | | Green | | | | | | | | | 100% | 100% | | | 35% | 91% | |
| | 2570-2620 | Yellow | | | | | | | | | 0% | 0% | | | 55% | 0% | |
| | | Red | | | | | | | | | 0% | 0% | | | 10% | 9% | |
| | | Green | | | | | | | | | 47% | 70% | | | 28% | 47% | |
| | 2620-2690 | Yellow | | | | | | | | | 10% | 12% | | | 19% | 8% | |
| | | Red | | | | | | | | | 43% | 18% | | | 53% | 45% | |
| | | Green | | | 0% | 89% | 0% | 100% | 0% | 72% | | | | | | | |
| | 2400-2484 | Yellow | | | 0% | 5% | 0% | 0% | 100% | 3% | | | | | | | |
| | | Red | | | 100% | 6% | 100% | 0% | 0% | 25% | | | | | | | |
| | 88-108 | Green | | | | | | | | | | | | | | | |
| | | Yellow | | | | | | | | | | | | | | | |
| | | Red | | | | | | | | | | | | | | | |
| | | Green | | | 0% | 84% | 0% | 100% | 0% | 80% | | | | | | | |
| | 2400-2484 | Yellow | | | 0% | 1% | 0% | 0% | 100% | 5% | | | | | | | |
| | | Red | | | 100% | 15% | 100% | 0% | 0% | 15% | | | | | | | |
| | 1575 | | | | | | | | | | | | | | | | |
| | 716-722 | | | | | | | | | | | | | | | | |
| | 722-728 | | | | | | | | | | | | | | | | |

Row labels (Radio Tech / Receiver Radio (Victim)): LTE/E-UTRA, Bluetooth, FM RX, WLAN, GPS, FLO Callout 710: Performance for one band combination

FIG. 7

Centralized Architecture

Decentralized Architecture

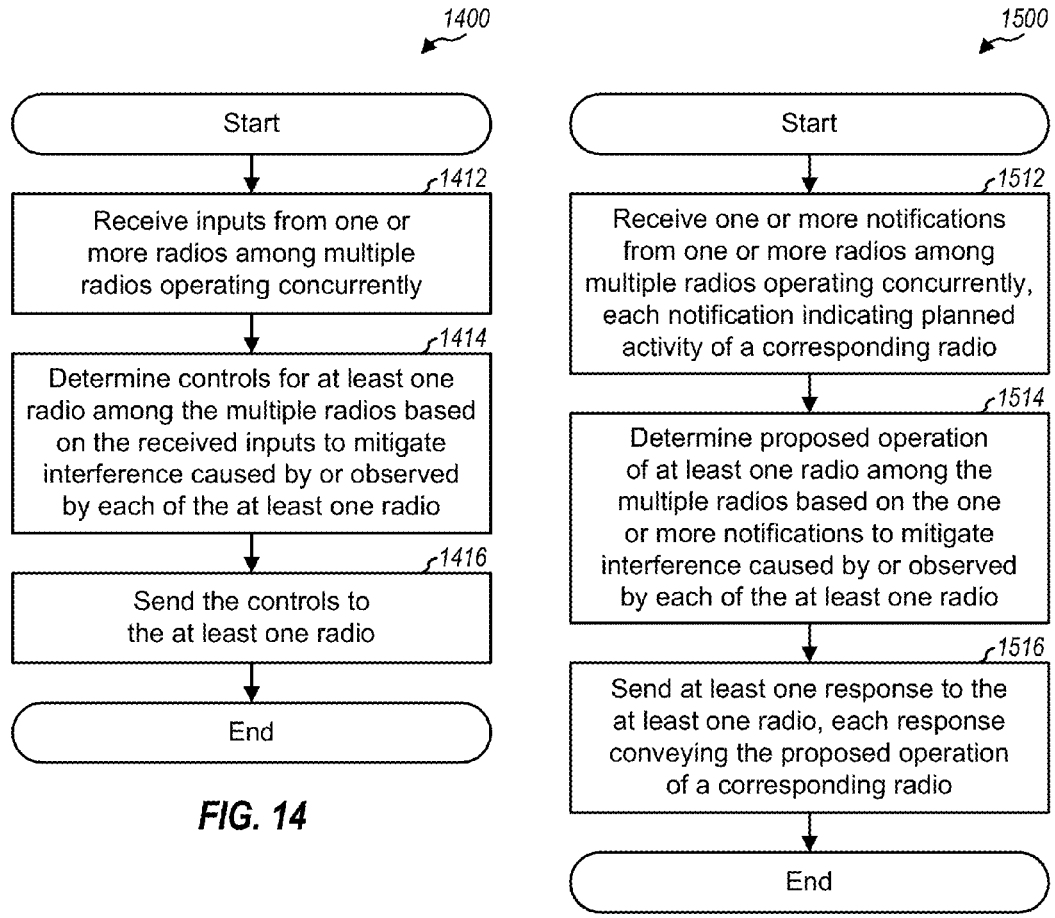
FIG. 14
FIG. 15
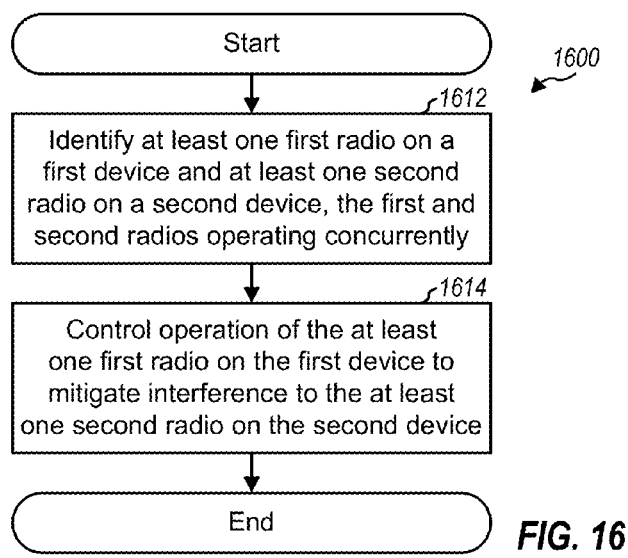
FIG. 16

COEXISTENCE MANAGER FOR CONTROLLING OPERATION OF MULTIPLE RADIOS

The present application claims priority to provisional U.S. Application Ser. No. 61/182,946 entitled "COEXISTENCE MANAGER FOR CONTROLLING OPERATION OF MULTIPLE RADIOS," filed Jun. 1, 2009, assigned to the assignee hereof and incorporated herein by reference.

BACKGROUND

I. Field

The present disclosure relates generally to communication, and more specifically to techniques for controlling radios for wireless communication.

II. Background

Wireless communication systems are widely deployed to provide various communication content such as voice, video, packet data, messaging, broadcast, etc. These wireless systems may include multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems. These wireless systems may also include broadcast systems and other systems.

A wireless communication device may include a number of radios to support communication with different wireless communication systems. Each radio may operate on certain frequency channels and bands and may have certain requirements. It may be desirable to control the radios in a manner to achieve good performance.

SUMMARY

Techniques for performing radio coexistence management to control operation of multiple radios to achieve good performance are described herein. In one design, an entity (e.g., a coexistence manager or a radio controller) may receive inputs from one or more radios among multiple radios operating concurrently. The entity may determine controls for at least one radio among the multiple radios based on the received inputs to mitigate interference caused by or observed by each of the at least one radio. The entity may send the controls to the at least one radio. Each radio may operate in accordance with the control sent to that radio.

In one design, the entity may receive an input indicative of a planned operating state of a radio in an upcoming time interval. In another design, the entity may receive an input indicative of planned activity of the radio in the upcoming time interval. The input from the radio may also comprise other information indicative of planned operation of the radio.

In one design, the entity may determine the controls for the at least one radio based on a database of information on performance versus operating states for different combinations of radios. The database may store the information in the form of a color chart or in some other format. The entity may select at least one operating state for the at least one radio based on the database to obtain acceptable performance for the at least one radio.

In one design, the entity may send a control indicative of a selected operating state for a radio in an upcoming interval. The radio may then operate in the selected operating state. In another design, the entity may send a control to set at least one configurable parameter of the radio. The configurable parameter(s) may include an amplifier, a filter, a transmit power level, an antenna, an antenna array, etc. The radio may set its configurable parameter(s) in accordance with the control. The control for the radio may also comprise other information indicative of proposed operation of the radio.

Various aspects and features of the disclosure are described in further detail below.

BRIEF DESCRIPTION OF THE DRAWINGS

FIG. 6 shows a plot of performance for a cell in a color chart.

FIG. 7 shows another exemplary color chart.

FIG. 14 shows a process for controlling operation of radios.

FIG. 15 shows another process for controlling operation of radios.

FIG. 16 shows a process for controlling radios on different devices.

DETAILED DESCRIPTION

Figure 1:
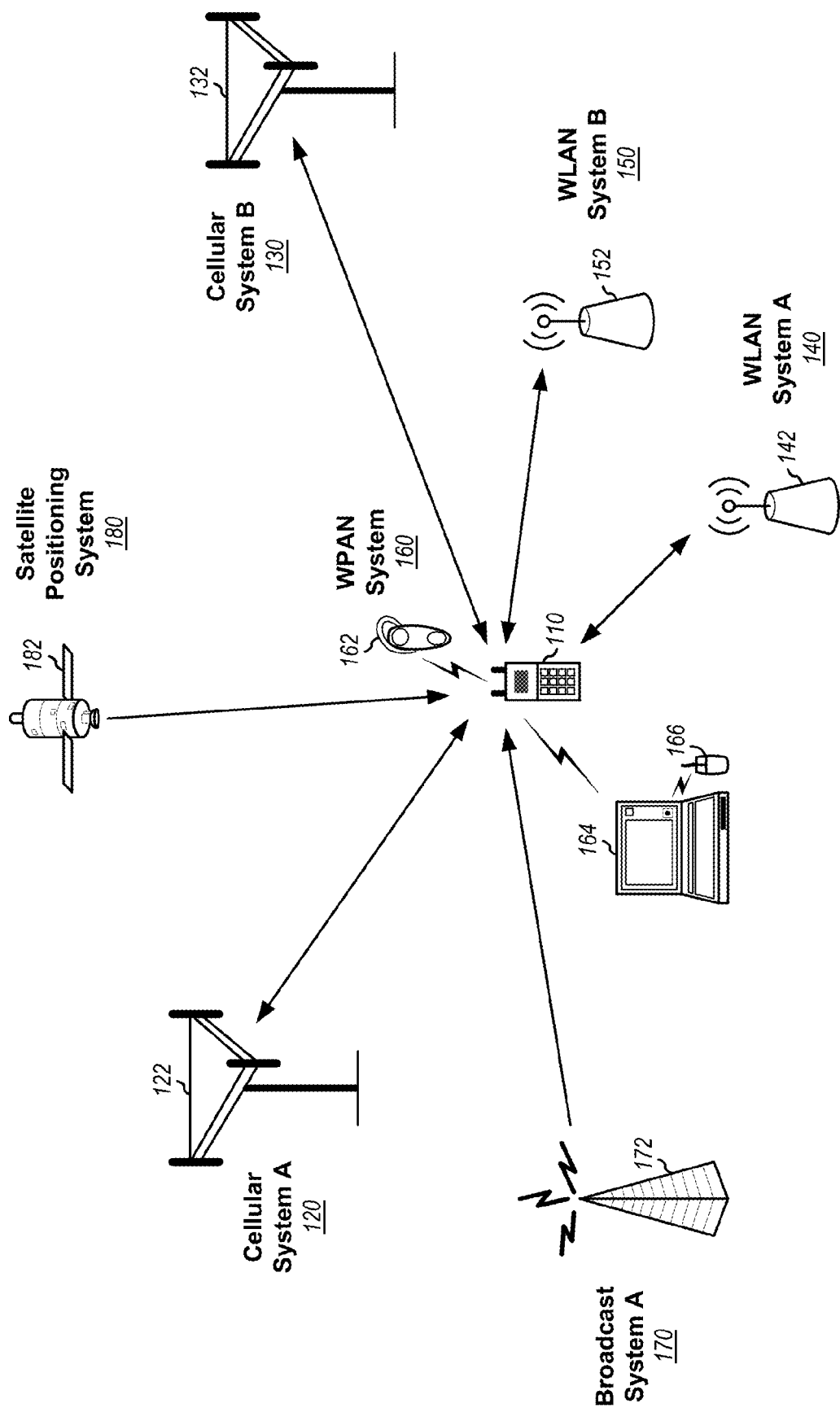
FIG. 1 shows a wireless device communicating with various systems.

FIG. 1 shows a wireless device 110 capable of communicating with multiple communication systems. These systems may include one or more wireless wide area network (WWAN) systems 120 and 130, one or more wireless local area network (WLAN) systems 140 and 150, one or more wireless personal area network (WPAN) systems 160, one or more broadcast systems 170, one or more satellite positioning systems 180, other systems not shown in FIG. 1, or any combination thereof. The terms "network" and "system" are often used interchangeably. The WWAN systems may be cellular systems.

Cellular systems 120 and 130 may each be a CDMA, TDMA, FDMA, OFDMA, SC-FDMA, or some other system. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000 (CDMA2000 1X), IS-95, and IS-856 (1xEVDO) standards. A TDMA system may implement a radio technology such as Global System for Mobile Communications (GSM), Digital Advanced Mobile Phone System (D-AMPS), etc. An OFDMA system may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). Cellular system 120 may include a number of base stations 122 that can support bi-directional communication for wireless devices within their coverage. Similarly, cellular system 130 may include a number of base stations 132 that can support bi-directional communication for wireless devices within their coverage.

WLAN systems 140 and 150 may each implement a radio technology such as IEEE 802.11 (Wi-Fi), Hiperlan, etc. WLAN system 140 may include one or more access points 142 that can support bi-directional communication. Similarly, WLAN system 150 may include one or more access points 152 that can support bi-directional communication. WPAN system 160 may implement a radio technology such as Bluetooth, IEEE 802.15, etc. WPAN system 160 may support bi-directional communication for various devices such as wireless device 110, a headset 162, a computer 164, a mouse 166, etc.

Broadcast system 170 may be a television (TV) broadcast system, a frequency modulation (FM) broadcast system, a digital broadcast system, etc. A digital broadcast system may implement a radio technology such as MediaFLO™, Digital Video Broadcasting for Handhelds (DVB-H), Integrated Services Digital Broadcasting for Terrestrial Television Broadcasting (ISDB-T), Advanced Television Systems Committee-Mobile/Handheld (ATSC-M/H), etc. Broadcast system 170 may include one or more broadcast stations 172 that can support one-way communication.

Satellite positioning system 180 may be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, etc. Satellite positioning system 180 may include a number of satellites 182 that transmit signals used for positioning.

Wireless device 110 may be stationary or mobile and may also be referred to as a user equipment (UE), a mobile station, a mobile equipment, a terminal, an access terminal, a subscriber unit, a station, etc. Wireless device 110 may be a cellular phone, a personal digital assistant (PDA), a wireless modem, a handheld device, a laptop computer, a cordless phone, a wireless local loop (WLL) station, a broadcast receiver, etc. Wireless device 110 may communicate two-way with cellular systems 120 and/or 130, WLAN systems 140 and/or 150, devices within WPAN system 160, etc. Wireless device 110 may also receive signals from broadcast system 170, satellite positioning system 180, an indoor positioning system, etc. In general, wireless device 110 may communicate with any number of systems at any given moment.

Figure 2:
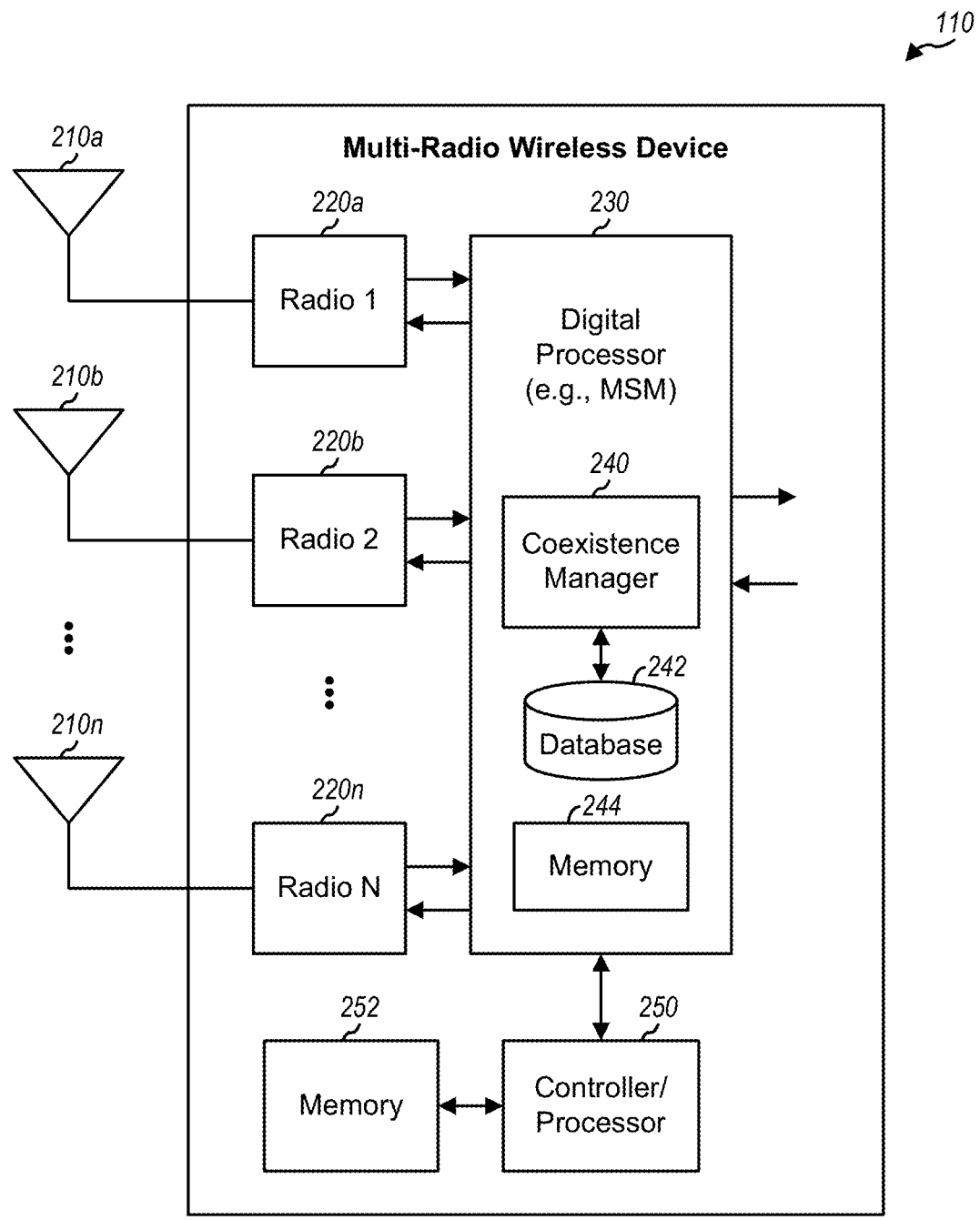
FIG. 2 shows a block diagram of the wireless device.

FIG. 2 shows a block diagram of a design of wireless device 110. In this design, wireless device 110 includes N radios 220a through 220n, where N may be any integer value. For example, wireless device 110 may include radios for 3GPP2 cellular systems (e.g., CDMA 1X, 1xEVDO, etc.), 3GPP cellular systems (e.g., GSM, GPRS, EDGE, WCDMA, HSPA, LTE, etc.), WLAN systems, WiMAX system, GPS, Bluetooth, FM radio (e.g., transmit and receive), broadcast systems (e.g., TV, MediaFLO™, DVB-H, ISDB-T, ATSC-M/H, etc.), Near Field Communication (NFC), Radio Frequency Identification (RFID), etc.

The N radios 220a through 220n may be coupled to N antennas 210a through 210n, respectively. For simplicity, FIG. 2 shows each radio 220 being paired with an associated antenna 210. In general, each radio 220 may be coupled to any number of antennas, and multiple radios may also share one or more antennas.

In general, a radio may be a unit that radiates or emits energy in an electro magnetic spectrum, receives energy in an electro magnetic spectrum, or generates energy that is passed via conductive means. As some examples, a radio may be (i) a unit that transmits a signal to a system or a device or (i) a unit that receives signals from a system or a device. A radio may thus support wireless communication. A radio may also be a unit (e.g., a screen on a computer, a circuit board, etc.) that emits noise, which may impact the performance of other radios. A radio may thus be a unit that emits noise and interference without supporting wireless communication. For simplicity, much of the description below is for radios used for wireless communication.

Radios 220 may comprise one or more types of radios. A radio may comprise a set of circuits designed to transmit or receive on a particular band for a particular system. A radio may also be a software defined radio (SDR) that may be configured to support multiple systems and/or multiple bands. For example, an SDR may include programmable circuits (e.g., tunable/switchable radio frequency (RF) filters, switched filter bank, tunable matching networks, etc.) that can operate at different frequencies. An SDR may also include programmable processing units that can perform processing for different systems. An SDR may be configured to operate on a particular band for a particular system at any given moment. A radio may also be a cognitive radio that can search for a clear frequency channel and operate on the clear frequency channel. A frequency channel may also be referred to as simply a channel.

Each radio 220 may support communication with a particular system and may operate on one or more frequency channels in one or more frequency bands. Multiple radios 220 may also be used for a given system, e.g., one radio to transmit and another radio to receive for the system. Multiple radios 220 may also be defined for different frequency bands, e.g., cellular and PCS bands.

A digital processor 230 may be coupled to radios 220a through 220n and may perform various functions such as processing for data being transmitted or received via radios 220. The processing for each radio 220 may be dependent on the radio technology supported by that radio and may include encoding, decoding, modulation, demodulation, encryption, decryption, etc. Digital processor 230 may include a coexistence manager (CxM) 240 that may control the operation of radios 220 in order to achieve good performance, as described below. Coexistence manager 240 may have access to a radio coexistence database 242, which may store information used to control the operation of the radios. Digital processor 230 may also include an internal memory 244 to store data and program codes.

For simplicity, digital processor 230 is shown as a single processor in FIG. 2. In general, digital processor 230 may comprise any number and any type of processors, controllers, memories, etc. For example, digital processor 230 may comprise one or more processors, microprocessors, central processing units (CPUs), digital signal processors (DSPs), reduced instruction set computers (RISCs), advanced RISC machines (ARMs), controllers, etc. A controller/processor 250 may direct the operation of various units within wireless device 110. A memory 252 may store program codes and data for wireless device 110. Digital processor 230, controller/processor 250, and memory 252 may be implemented on one or more integrated circuits (ICs), application specific integrated circuits (ASICs), etc. For example, digital processor 230 may be implemented on a Mobile Station Modem (MSM) ASIC.

Figure 3:
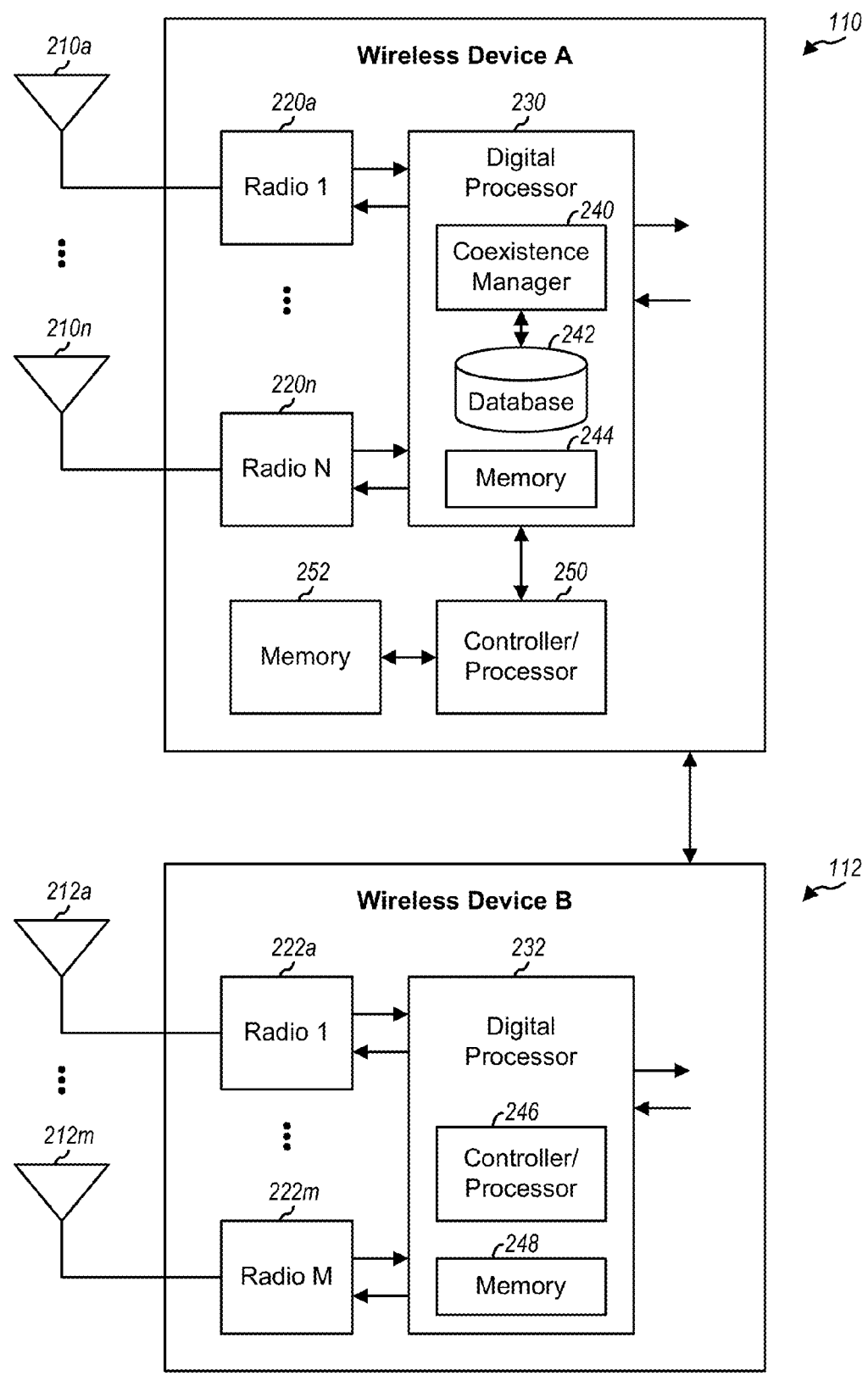
FIG. 3 shows a block diagram of two wireless devices.

FIG. 3 shows a block diagram of a design of wireless device 110 (Device A) and a wireless device 112 (Device B). Device 112 includes M radios 222a through 222m coupled to M antennas 212a through 212m, respectively, where M may be any integer value. In general, a device may be any unit that may be packaged separately and may include any number of radios. For example, device 112 may correspond to headset 162 or computer 164 in FIG. 1 or some other device.

Devices 110 and 112 may communicate with one another via a wireline interface (as shown in FIG. 3) and/or a wireless interface. Coexistence manager 240 may receive inputs from radios 220 and/or 222 and may control the operation of these radios in order to achieve good performance, as described below.

As shown in FIGS. 2 and 3, multiple radios in one or more devices may be located in close proximity of one another and may cause or observe interference that may degrade performance. Each radio may operate on one or more frequency channels in one or more frequency bands. Each radio may cause interference to other radios or may observe interference from other radios. The impact of a given radio on another radio may be dependent on various factors such as the frequency channel and frequency band used by each radio, the radio technology supported by each radio, the radio conditions observed by each radio, the design and implementation of each radio, etc. In general, multiple radios in close proximity may often create significant operational issues, particularly under conditions of concurrency, with the multiple radios operating simultaneously. Insufficient isolation for co-located radios (for both radiated and conductive noise) and spectrum co-occupancy or adjacency may be major causes of radio coexistence problems.

Coexistence manager 240 may coordinate the operation of radios. Coexistence manager 240 may provide (i) a scalable and upgradeable solution for coexistence mitigation where point solutions may be incorporated and (ii) a unified framework that may be implemented in an evolutionary manner. Point solutions refer to solutions to problems between specific radios. The framework may also allow for incorporation of RF and baseband changes for future enhancements. The coexistence management function may arbitrate operations between various radios to provide resolutions when coexistence problems are detected.

Coexistence manager 240 may receive inputs from active radios, which may be radios that are currently operational. The inputs from each active radio may indicate a planned or expected operating state of the radio in an upcoming time interval, planned activity of the radio, etc. An activity may also be referred to as an event. Coexistence manager 240 may determine controls for the active radios based on the received inputs to mitigate interference between these radios. For example, the controls may relate to silencing, time arbitration, frequency arbitration, adaptive modulation, adaptive digital notch filtering, etc., to mitigate interference. Coexistence manager 240 may send the controls to all affected radios to achieve good performance.

Coexistence manager 240 may control the operation of the active radios to achieve good performance for as many radios as possible. A radio may have one or more configurable parameters that may be adjusted to mitigate interference from the radio and/or to improve performance of the radio. A configurable parameter may be for a physical component within the radio, such as an amplifier, a filter, an antenna, an antenna array, etc. A configurable parameter may also be for an operational parameter such as a transmit power level, a frequency channel, a traffic channel, etc. A received power level may also be a configurable parameter if it can be varied, e.g., by selecting different antennas and/or more antennas. Each configurable parameter may be set to one of multiple possible settings/values applicable for that parameter. The radio may have an operating state, which may be defined by a particular setting for each configurable parameter. A configurable parameter may also be referred to as a "knob", a configurable parameter setting may also be referred to as a "knob setting", and an operating state may also be referred to as a "knob state".

Coexistence manager 240 may utilize radio coexistence database 242 to control the operation of the active radios. In one design, database 242 may comprise information on performance versus operating states for different combinations of radios. Database 242 may store the information using various structures and formats.

Figure 4:
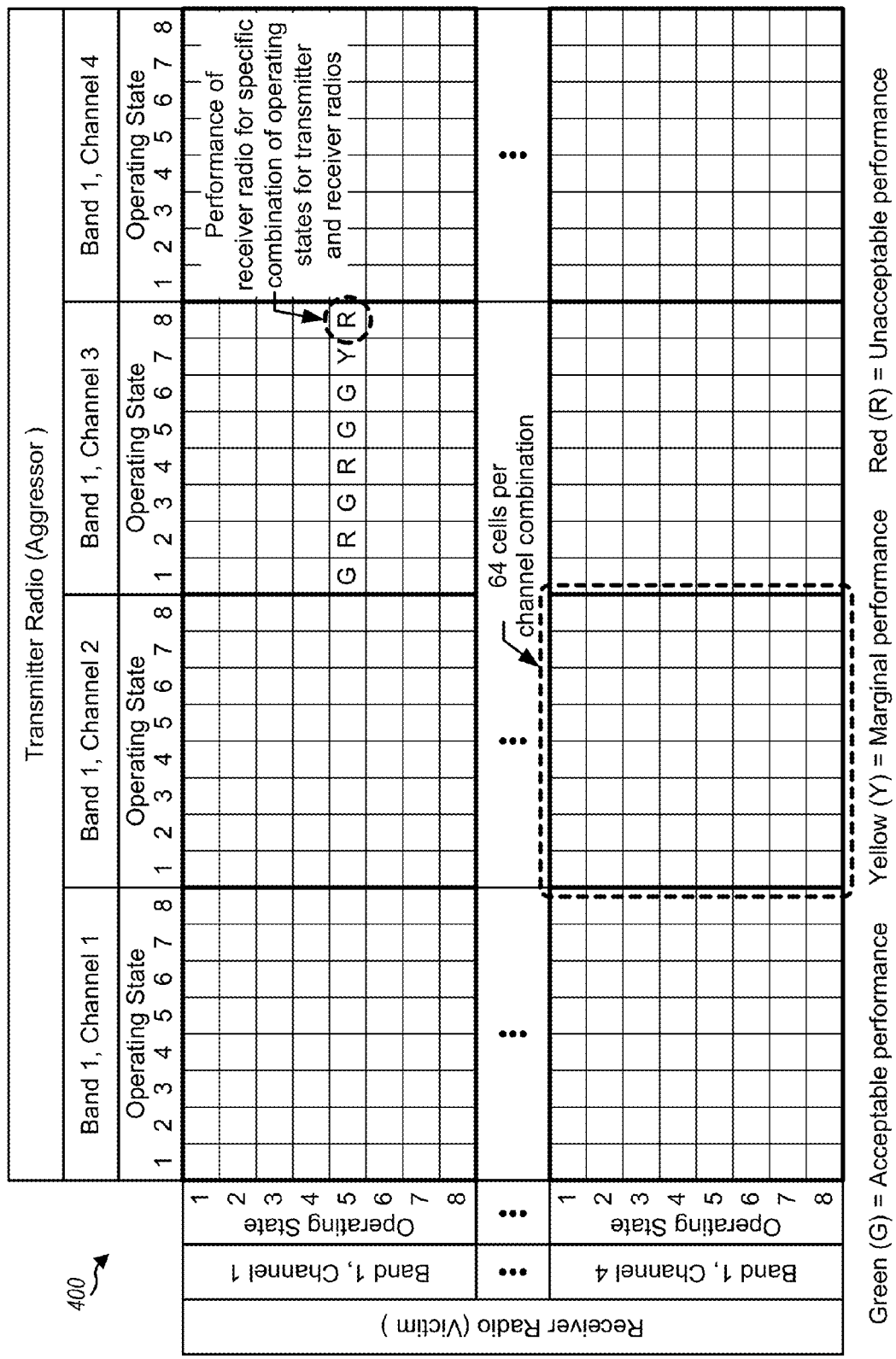
FIGS. 4 and 5 show two exemplary color charts.

FIG. 4 shows a design of a color chart 400, which is one design of a radio coexistence database that may be used to control active radios. In color chart 400, the horizontal axis may be for a transmitter radio, which may cause interference and may be controllable. The vertical axis may be for a receiver radio, which may be adversely impacted by the interference from the transmitter radio and may also be controllable. The transmitter radio may be referred to as an aggressor, and the receiver radio may be referred to as a victim. For simplicity, FIG. 4 shows only some frequency channels for the transmitter radio and only some frequency channels for the receiver radio. Color chart 400 may cover other radios and other frequency channels that are not shown in FIG. 4 for simplicity.

Color chart 400 includes a number of column sets for different frequency channels on which the transmitter radio can operate. Each column set includes a number of columns for different operating states (or knob states) of the transmitter radio. In the example shown in FIG. 4, each column set includes eight columns for eight different operating states of the transmitter radio. Fewer or more operating states may also be supported for the transmitter radio.

Color chart 400 also includes a number of row sets for different frequency channels on which the receiver radio can operate. Each row set includes a number of rows for different operating states of the receiver radio. In the example shown in FIG. 4, each row set includes eight rows for eight different operating states of the receiver radio. Fewer or more operating states may also be supported for the receiver radio. In general, each radio may have any number of operating states. One row or one column may be provided for each operating state that may be selected for the radio for interference management purposes.

In the design shown in FIG. 4, the performance of a radio may be quantified by (or quantized to) one of three possible levels—"acceptable", "marginal", and "unacceptable" or "severe". The acceptable, marginal, and unacceptable levels may be represented by green, yellow, and red colors, respectively, in color chart 400. The acceptable level may correspond to a case in which the performance of the radio meets all applicable requirements. The marginal level may correspond to a case in which (i) the performance of the radio meets all applicable requirements but possibly with small margins or (ii) the performance of the radio meets key requirements but possibly not all requirements. The unacceptable level may correspond to a case in which the performance of the radio does not meet applicable requirements and should be improved. In general, performance may be quantified with any number of levels, e.g., 2, 4, etc. Each level may be defined in any manner, which may be dependent on the requirements of the radio. More levels may allow for better control of the radios at the expense of more memory to store these levels.

In the design shown in FIG. 4, color chart 400 includes a cell (or a square box) for each unique combination of operating states for the transmitter and receiver radios. Cell (i, j) may correspond to operating state i for the transmitter radio and operating state j for the receiver radio. Cell (i, j) may be populated with a performance level for the receiver radio with the transmitter radio in operating state i and the receiver radio in operating state j.

The design in FIG. 4 may allow for selection of an operating state for the transmitter radio independently of selection of an operating state for the receiver radio. The performance of the receiver radio for the selected operating states for the transmitter and receiver radios may be determined by the cell covering this combination of operating states.

In general, for the design shown in FIG. 4, a color chart may cover U operating states for the transmitter radio and V operating states for the receiver radio for a specific frequency channel for each radio, where U≥1 and V≥1. A total of U×V cells may be used to quantify the performance of the receiver radio for different combinations of operating states for the transmitter and receiver radios. If U=1 and V=1, then the color chart may include a single cell for each frequency channel pair for a specific operating state for each radio.

Figure 5:
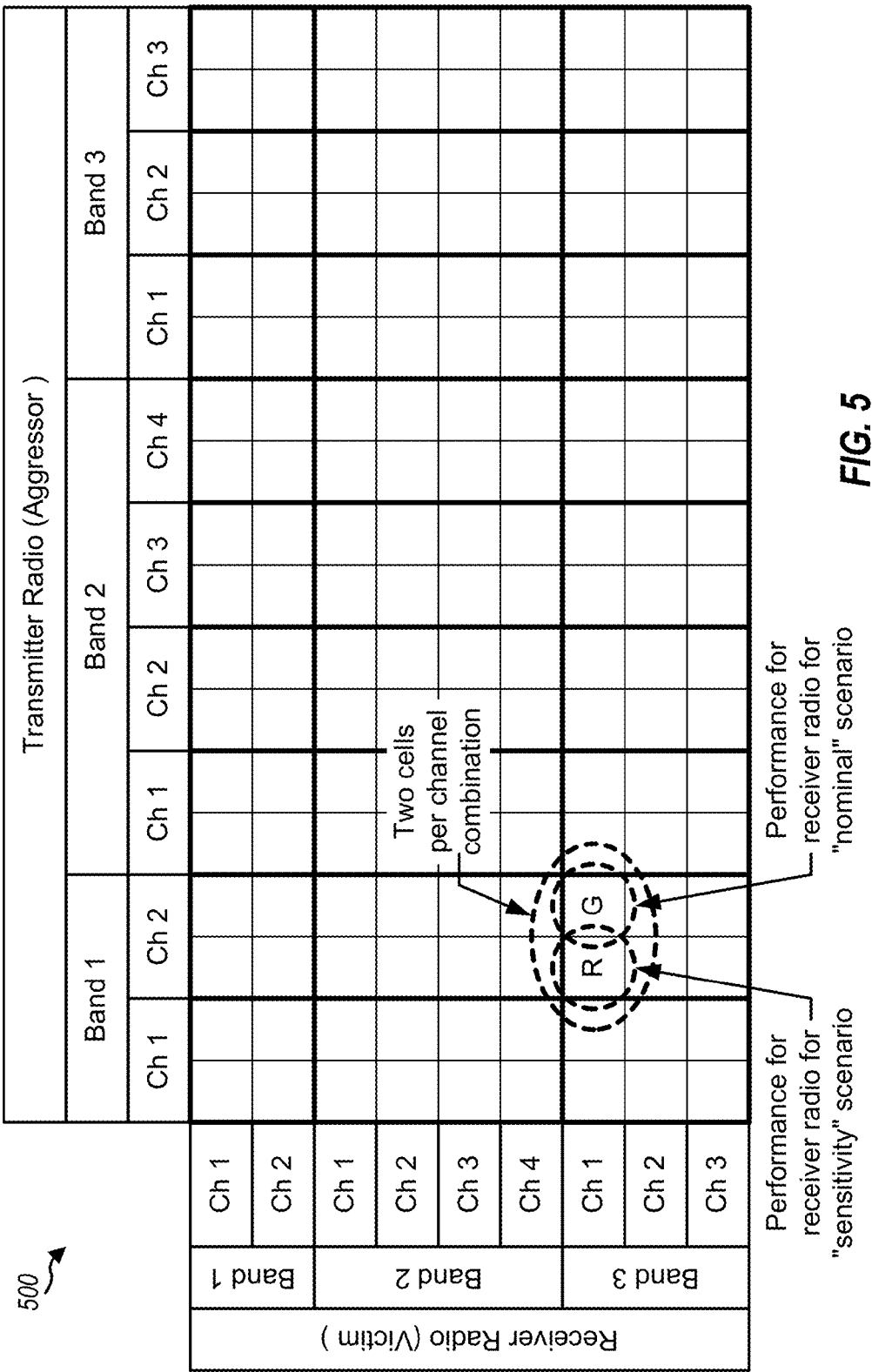

FIG. 5 shows a design of a color chart 500, which is another design of a radio coexistence database that may be used to control active radios. In color chart 500, the horizontal axis may be for transmitter radios, which may cause interference and may be controllable. The vertical axis may be for receiver radios, which may be impacted by the interference from the transmitter radios and may also be controllable. For simplicity, FIG. 5 shows only one transmitter radio and only one receiver radio.

In the design shown in FIG. 5, color chart 500 includes two cells for each channel combination covering a specific frequency channel for a transmitter radio (or aggressor) and a specific frequency channel for a receiver radio (or victim). Each cell may be associated with a specific operating scenario for the transmitter and receiver radios and may convey the performance of the receiver radio for the operating scenario. For example, the left cell for the frequency combination may convey the performance of the receiver radio for a "sensitivity" scenario, and the right cell may convey the performance of the receiver radio for a "nominal" scenario. The sensitivity scenario may be defined by (i) the transmitter radio transmitting at a maximum power level (Pmax) and (ii) the receiver radio operating at or near sensitivity level (RXmin) and attempting to receive a very weak signal. Pmax and RXmin may be specified by the standards applicable for the transmitter and receiver radios, respectively. The sensitivity scenario may occur if wireless device 110 is located far away from a base station and needs to transmit an uplink signal at a high power level in order to reach the base station while also receiving a downlink signal from the base station at a low power level. The nominal scenario may be defined by (i) the transmitter radio transmitting at least X dBm lower than Pmax and (ii) the receiver radio operating at least Y decibel (dB) higher than RXmin, where X and Y may be any suitable values. The performance for the sensitivity and nominal scenarios may assume typical settings for various configurable parameters (or typical knob settings) for the transmitter and receiver radios.

In one design, the performance level for each cell in color chart 500 may be given by one of three levels—acceptable, marginal, and unacceptable, which may be defined as described above for FIG. 4. The performance level for each cell may also be given by fewer or more levels.

In general, for the design shown in FIG. 5, a color chart may include Q cells for each channel combination covering a specific frequency channel for a transmitter radio and a specific frequency channel for a receiver radio. Each cell may be associated with a specific operating scenario for the transmitter and receiver radios and may convey the performance of the receiver radio for the associated operating scenario. The Q cells for the color chart in FIG. 5 may be a subset of the cells for the color chart in FIG. 4, and these Q cells may be for the more likely operating scenarios. Performance may be quantified with any number of levels. Performance may also be quantified by a value, e.g., a margin between the achievable performance and the required performance. More cells and/or more performance levels may allow for better control of the radios.

FIG. 6 shows a design of a 3-dimensional plot 600 of performance for one cell in a color chart. For example, plot 600 may be obtained for each cell in color chart 400 in FIG. 4, for each cell in color chart 500 in FIG. 5, etc. Performance may be quantified by a margin between achievable performance and required performance. Performance plot 600 may be obtained based on a function of specific parameter settings for a transmitter radio, specific parameter settings for a receiver radio, a transmit power level for the transmitter radio, and a received power level for the receiver radio, as follows:

$$\text{Margin}=f(\textit{TX power},\textit{RX power},\text{other parameter settings}), \quad \text{Eq (1)}$$

where $f(\ )$ may be any suitable function.

In FIG. 6, the x-axis may represent the received power of the receiver radio, the y-axis may represent the transmit power of the transmitter radio, and the z-axis may represent margin. As shown in FIG. 6, performance (or margin) may be dependent on the transmit power and the received power. The desired performance may be obtained by adjusting the transmit power and/or the received power.

The performance levels for the cells in color chart 500 in FIG. 5 may be determined based on plots such as plot 600 in FIG. 6. For example, the margin at a given (x, y) point corresponding to the sensitivity scenario may be determined. This margin may be compared against two thresholds TH1 and TH2 to determine whether the performance is acceptable, marginal, or unacceptable, as shown in FIG. 6.

In one design, a set of plots may be obtained for different configurable parameter settings for the transmitter radio and the receiver radio. In one design, the operating states for the transmitter and receiver radios may be selected based on the set of plots. For example, the least restrictive operating states for the transmitter and receiver radios that can provide the desired performance may be selected. The plots may thus be used to select the operating states for the transmitter and receiver radios. In another design, configurable parameter settings for the transmitter and receiver radios may be selected based on other considerations. For both designs, the transmit power and/or the received power may be adjusted based on the plot for the selected parameter settings.

In another design, a set of performance plots may be obtained for different configurable parameter settings for the transmitter and receiver radios for a channel combination covering a specific frequency channel for the transmitter radio and a specific frequency channel for the receiver radio. The set of performance plots may be aggregated to obtain an overall plot. The aggregation may be performed in various manners. In one design, each (x, y) point in the overall plot may be assigned the best performance from the set of plots for that (x, y) point. The overall plot may thus be obtained by superimposing all of the plots in the set and saving the highest point for all plots. The overall plot may then represent the best possible performance for each (x, y) point.

FIG. 7 shows a design of a color chart 700, which is yet another design of a radio coexistence database that may be used to control active radios. In color chart 700, the horizontal axis may be for transmitter radios and may cover different frequency bands (instead of different frequency channels). A band may cover a number of frequency channels. The specific number of frequency channels in each band may be dependent on the radio technology, the band, etc. The vertical axis may be for receiver radios and may also cover different bands.

In the design shown in FIG. 7, color chart 700 includes six cells for each band combination covering a specific band for a transmitter radio and a specific band for a receiver radio. For a given band combination, three cells in the left column provide performance for the sensitivity scenario (Sen), and three cells in the right column provide performance for the nominal scenario (Nom). The two cells in the top row indicate the percentage of channels with acceptable performance, the two cells in the middle row indicate the percentage of channels with marginal performance, and the two cells in the bottom row indicate the percentage of channels with unacceptable performance. For example, in block 710 covering a Bluetooth transmitter in the 2.4 GHz band and an LTE receiver in the 2.6 GHz band, 47 percent of all frequency channels have acceptable performance for the sensitivity scenario, 10 percent of all frequency channels have marginal performance, and 43 percent of all frequency channels have unacceptable performance. The information in color chart 700 may be obtained by (i) determining the performance (e.g., acceptable, marginal, or unacceptable) for each frequency channel in the band combination for a given scenario (e.g., sensitivity or nominal) and (ii) determining the percentage of frequency channels for each performance level.

FIGS. 4 through 7 show exemplary designs of 2-dimensional color charts for two radios. In general, the performance of a given radio may be impacted by one or more other radios. A color chart may be defined with K dimensions for K radios operating concurrently, where K may be any integer value. For example, the performance of one or more radios may be given by the operating states of the K radios.

FIGS. 4 through 7 show some exemplary designs of color charts that may be used for a radio coexistence database. Information regarding interference due to coexisting radios may also be captured and presented in a color chart or a database in other manners, e.g., quantized in other ways, presented using other formats or structures, etc.

Information for a radio coexistence database (e.g., a color chart) may be obtained in various manners. In one design, the information may be obtained via calculation, computer simulation, etc. Any suitable modeling and simulation tools may be used to analytically obtain information on interference between coexisting radios. The information may be analytical in nature and may be independent of the design and implementation of the radios.

In another design, information for the radio coexistence database may be obtained via empirical measurements, lab or field testing, etc. For example, testing may be performed for different configurable parameter settings and power levels for different combinations of transmitter and receiver radios. Performance data may be collected and used to derive information for the radio coexistence database. The information may be dependent on the design and implementation of the radios. The radio coexistence database may be loaded into wireless device 110 during the manufacturing phase. The database may also be downloaded over the air, e.g., from a system with which wireless device 110 is in communication.

In yet another design, information for the radio coexistence database may be obtained during actual operation of the radios. For example, wireless device 110 may determine the performance of a receiver radio for different combinations of operating states (e.g., different power levels) for a transmitter radio and the receiver radio during normal operation. The performance may be specific to wireless device 110. Wireless device 110 may update the radio coexistence database (e.g., the cells in a color chart) whenever performance data is obtained during normal operation.

The information for the radio coexistence database may also be obtained or updated in other manners. The radio coexistence database may be updated to account for various factors such as temperature, component aging/drift, voltage/current variations, antenna pulling (e.g., due to device proximity, obstacles, cables, etc.), frequency, transmit and received power levels, etc.

In one design, wireless device 110 may send information measured and collected by wireless device 110 to the system. The system may aggregate information obtained from different wireless devices to form a master radio coexistence database. All or a portion of the master database may be downloaded to the wireless devices for use for coexistence management.

The radio coexistence database at wireless device 110 may also include other information beside interference information. For example, the database may include information regarding frequency bands of operation, maximum transmit power, and/or other information for each radio. The database may also include information pertinent to each activity of a radio such as event time, event duration, etc.

The radio coexistence database for all N radios 220 may be relatively large, especially for a large number of radios, a large number of frequency channels, a large number of operating states for each radio, etc. In one design, the entire radio coexistence database may be stored in a bulk non-volatile memory (e.g., memory 252 in FIG. 2). The bulk memory may be a NAND Flash, a NOR Flash, or some other type of memory with large storage capacity. A pertinent portion of the radio coexistence database may be loaded from the bulk memory into a faster memory for quick access by coexistence manager 240. The faster memory may be memory 244 within digital processor 230 and may be static random access memory (SRAM) or some other type of memory. The loaded portion of the radio coexistence database may include information for all active radios, for active radios that might collide with one another, etc. The loaded portion in the faster memory may be updated whenever a radio becomes active or an active radio becomes inactive.

The radio coexistence database may be used for various purposes such as radio selection, radio management, etc. Radio selection refers to selection of a particular radio for a particular application. Radio management refers to management of coexisting radios to achieve good performance for as many radios as possible. Radio selection may be performed based on the entire radio coexistence database. Radio management may be performed based on a portion of the radio coexistence database for the active radios.

For radio selection, multiple radios may be used for a particular application. The most suitable radio among these multiple radios may be selected for the application based on the radio environment and the radio coexistence database. For example, an LTE radio may be selected instead of a WLAN radio due to higher interference observed or caused by the WLAN radio in the radio environment. The selected radio may thus be a radio that can provide good (e.g., the best possible) performance for the given radio environment. Radio selection may be static/semi-static or dynamic, depending on changes in the radio environment. For example, a particular radio in wireless device 110 may be selected and used for an extended period of time if the radio environment is relatively static, e.g., wireless device 110 is not mobile. Alternatively, different radios may be selected due to changing radio environment, e.g., resulting from mobility of wireless device 110. The radio environment may also change due to other radios within the vicinity of wireless device 110 being enabled or disabled.

For radio management, coexistence manager 240 may use the radio coexistence database (e.g., color chart 400) to control the operation of the active radios. For example, coexistence manager 240 may receive inputs indicative of planned operating states of transmitter and receiver radios and may determine the performance of the receiver radio with these planned operating states. If the performance of the receiver radio is unacceptable (or possibly marginal), then coexistence manager 240 may select a new operating state for the transmitter radio and/or a new operating state for the receiver radio such that the performance of the receiver radio is acceptable (or possibly marginal). The new operating state for the transmitter radio may comprise a change in transmit power level and/or other configurable parameters (e.g., a new frequency channel) for the transmitter radio. In any case, if a new operating state is selected for any radio, then coexistence manager 240 may send each new operating state to the corresponding radio.

Radio coexistence management may be implemented with various architectures such as a centralized architecture or a decentralized architecture. For the centralized architecture, coexistence manager 240 may receive inputs from active radios and may determine controls (e.g., operating states) for the radios such that good performance can be achieved for as many radios as possible. For the decentralized architecture, which may also be referred to as a distributed architecture, the active radios may communicate with each other to determine controls for the radios. Coexistence manager 240 may provide management function in the decentralized architecture.

Figure 8A:
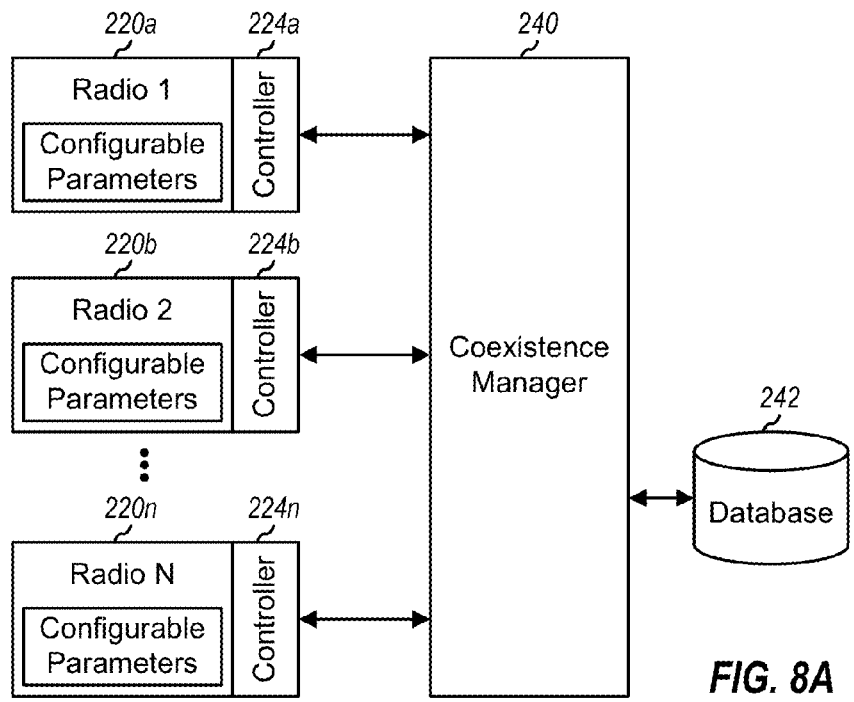
FIGS. 8A and 8B show radio coexistence management with centralized and decentralized architectures, respectively.

FIG. 8A shows a design of radio coexistence management with the centralized architecture. In this architecture, coexistence manager 240 may communicate with all active radios 220 via a messaging bus. The messaging bus may support software-based messaging or hardware-based messaging. The messaging bus may have sufficiently short latency to support coordination of the active radios and their respective messaging and system timing. The communication between coexistence manager 240 and active radios 220 may also be based on a suitable messaging protocol.

The active radios 220 may be located on a single device (e.g., device 110 in FIG. 2) or on multiple devices (e.g., devices 110 and 112 in FIG. 3). Each radio 220 may be considered as a separate entity to coexistence manager 240. Each radio 220 may be associated with a radio controller 224 that may support radio coexistence for the radio and may also communicate with coexistence manager 240. Each radio 220 may also have one or more configurable parameters that may be varied to mitigate interference caused or observed by that radio.

Coexistence manager 240 may perform various management functions to support radio coexistence. For example, coexistence manager 240 may support registration by radios 220, event notifications, resolution and arbitration of events, and notification responses. Coexistence manager 240 may receive inputs from all active radios 220. Coexistence manager 240 may utilize radio coexistence database 242 to make decisions on the operation of the active radios based on the received inputs. Coexistence manager 240 may determine controls (e.g., operating states) for the radios such that good performance can be achieved for the radios. Coexistence manager 240 may send the controls to the affected radios.

Figure 8B:
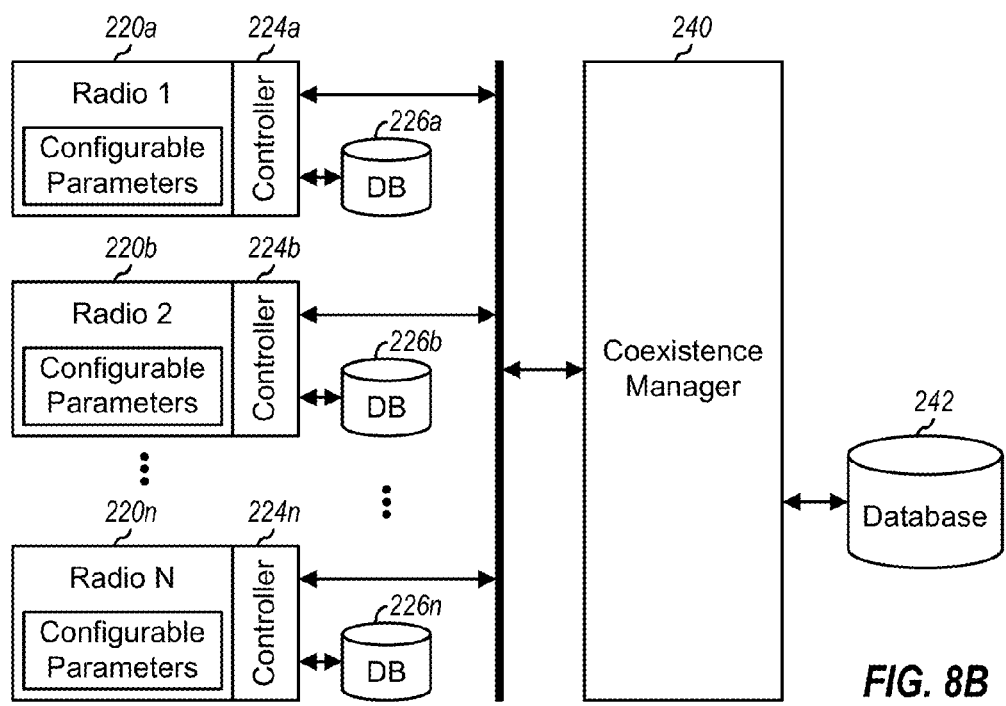

FIG. 8B shows an exemplary design of radio coexistence management with the decentralized architecture. In this architecture, the active radios 220 may communicate with one another and/or with coexistence manager 240 to support radio coexistence. The arbitration function for radio coexistence may be shared across the active radios 220 instead of concentrated at coexistence manager 240. The best operating states for the active radios may be determined by distributed processing by at least one and perhaps all of the active radios. The active radios may reside in multiple devices (e.g., devices 110 and 112), and the distributed processing may be extended to encompass all radios in all devices. Each active radio 220 may have an associated database 226 that may be used by radio controller 224 for that radio to made decisions affecting planned activities of the radio. Coexistence manager 240 may provide management function.

For both the centralized architecture in FIG. 8A and the decentralized architecture in FIG. 8B, various message flows may be defined to control the operation of the active radios to achieve good performance. The message flows may be implemented in various manners depending on the selected architecture and other factors.

Figure 9:
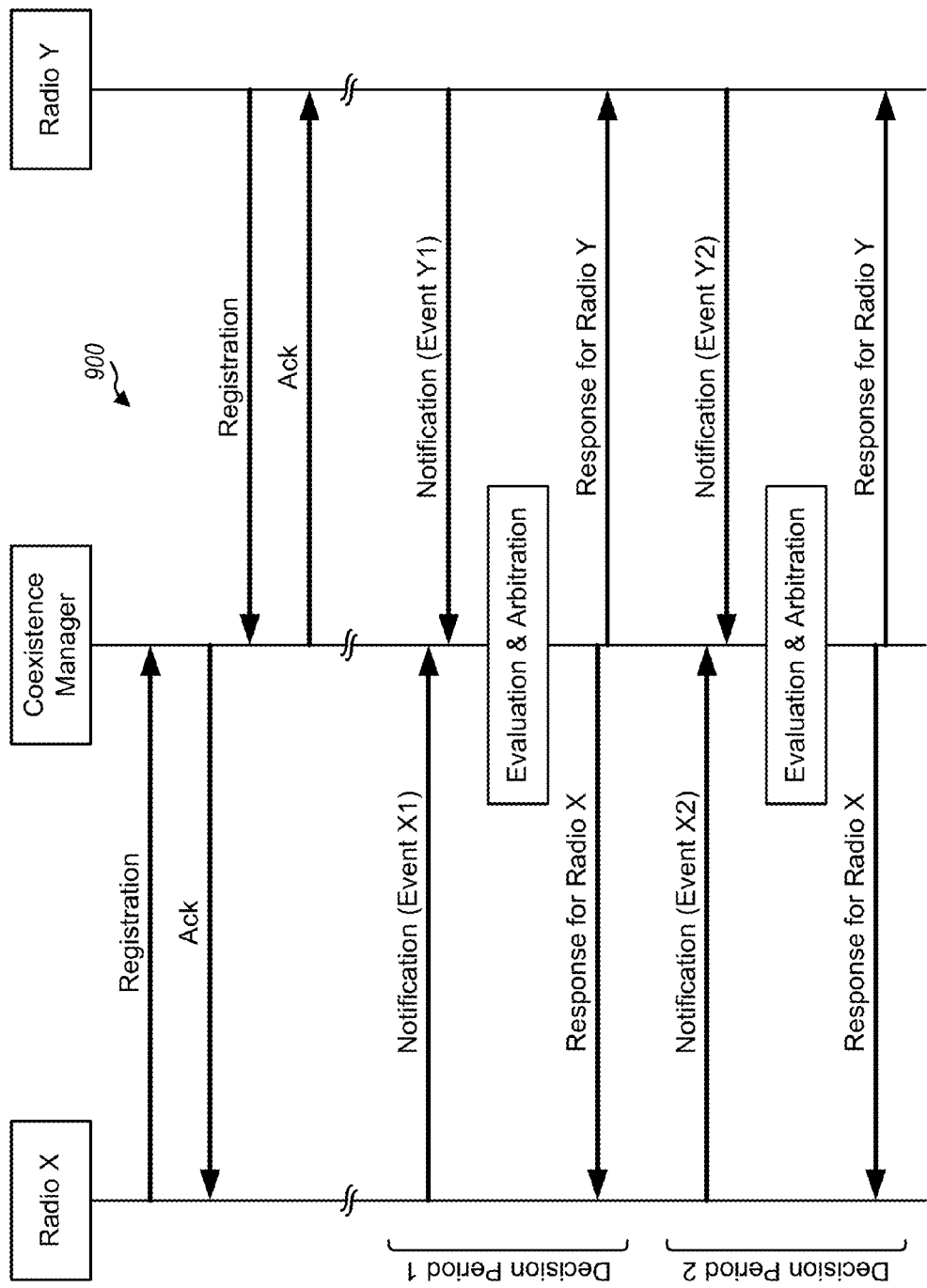
FIG. 9 shows a message flow for centralized radio coexistence management.

FIG. 9 shows a design of a message flow 900 for controlling radios by coexistence manager 240 for the centralized architecture in FIG. 8A. In general, coexistence manager 240 may communicate with up to N active radios 220. For simplicity, only two radios X and Y are shown in FIG. 9. For clarity, the processing performed by radio X is described below. Similar processing may be performed by each active radio.

In one design, radio X may register itself with coexistence manager 240 via a registration event (RE). Radio X may perform registration when wireless device 110 is powered up, when radio X is selected for use, or when some other trigger condition occurs. Radio X may identify its configurable parameters, which may be dependent on its radio technology and design. The registration may allow coexistence manager 240 to become aware of radio X, to obtain pertinent information for radio X, to determine a pertinent portion of the radio coexistence database for radio X, to download this portion of the database from external memory to internal memory, to allocate communication resources to radio X, etc. Different radios may register with coexistence manager 240 at different times.

In one design, radio X may notify coexistence manager 240 of its planned activity via a notification, which may also be referred to as a notification event (NE). The planned activity or event may be for transmission or reception and may be associated with a planned operating state in which the planned activity will occur. For example, radio X may be a transmitter radio and may send a notification of its planned activity to request silence from other transmitter radios or to allow receiver radios to take appropriate actions, e.g., due to interference from radio X. Radio X may also be a receiver radio and may send a notification of its planned activity to allow transmitter radios to avoid collision with radio X on the same band and/or to allow other receiver radios to take appropriate actions.

Radio X may provide the planned activity, the planned operating state, and/or other information in the notification. In one design, the notification may convey one or more of the following:

Radio identity (ID) of radio X,

Planned operating state of radio X,

Priority of the planned activity and/or priority of radio X,

Start time and/or periodicity of the planned activity,

Stop time and/or duration of the planned activity,

Deadline of the planned activity,

Transmit power level and frequency channel to use for the planned activity, and/or Other information for the planned activity or for radio X.

The priority of the planned activity and/or the priority of radio X may be assigned by coexistence manager 240 (e.g., during registration of radio X), or assigned by some other entity responsible for assigning priority, or ascertained in other manners. The entity assigning priority may reside within wireless device 110 or in a system. Priorities may have globally defined meanings, and activities from different radios with the same priority may have equal importance. Priorities may be static or may be dynamically changed. For example, the priority of an activity may increase as its deadline approaches.

In one design, radio X may send notifications periodically in each decision period when there is planned activity, e.g., as shown in FIG. 9. A decision period may cover a particular time duration, which may be selected based on the desired latency for decisions from coexistence manager 240. For example, a decision period may cover 100 microseconds (μs) or some other duration. In another design, radio X may send a notification whenever there is a change in the planned activity or the planned operating state of radio X. In this design, the activity and the operating state for radio X in a prior decision period may be used for the current decision period unless a new planned activity and/or a new planned operating state is sent by radio X.

Coexistence manager 240 may receive notifications from all active radios in a decision period and may perform evaluation and arbitration as necessary. Coexistence manager 240 may determine whether any of the active radios will collide with one another. A collision may occur between a transmitter radio and a receiver radio if their concurrent operation will adversely impact the performance of one radio (typically the receiver radio) beyond an acceptable level. For example, the transmit power of the transmitter radio may cause interference to the receiver radio and may result in unacceptable performance for the receiver radio. In one design coexistence manager 240 may arbitrate between colliding radios and may make decisions on activities for the next decision period. The arbitration may be based on a set of rules that may be defined based on desired goals. The set of rules may operate on preferences, priorities, and/or other performance metrics. Coexistence manager 240 may essentially implement an event scheduling algorithm, which may be based on proportional fairness and/or other criteria. In another design, coexistence manager 240 may select one or more radios based on a set of rules, determine appropriate notification alerts for radios impacted by each selected radio, and send the notification alerts to the impacted radios.

Coexistence manager 240 may send a response to each affected radio. The response may also be referred to as a notification alert (NA). There may be multiple responses for multiple radios due to a notification from one radio. For example, a high-power transmit activity by a GSM transmitter radio may impact multiple coexisting radios such as a broadcast TV receiver radio and a GPS receiver radio. A response for a radio may indicate a selected operating state for the radio, at least one configurable parameter setting for the radio, etc. Each radio that receives a response may adjust its operation (e.g., change its operating state, adjust one or more configurable parameters, etc.) in accordance with the response to reduce interference to other radios or to combat interference from other radios.

In one design, radio coexistence management may be performed in a synchronous manner, e.g., as shown in FIG. 9. In this design, the active radios may send their notifications periodically in each decision period. For example, each radio may be assigned a particular time slot in each decision period and may send its notification in the assigned time slot. This design may allow a number of radios to share a common bus and to send their notifications without collision on the common bus. Coexistence manager 240 may make decisions and may send responses periodically in each decision period. For example, coexistence manager 240 may make decisions in a first interval and may send responses in a second interval of each decision period. Each response may include a radio ID of a radio to which the response is intended. All active radios may listen for responses sent by coexistence manager 240. Each radio may retain the response sent to that radio, as determined by the radio ID.

In another design, radio coexistence management may be performed in an asynchronous manner. In this design, each radio may send its notification whenever triggered, e.g., due to planned activity in an upcoming interval. Coexistence manager 240 may make decisions and send responses whenever notifications are received.

Figure 10:
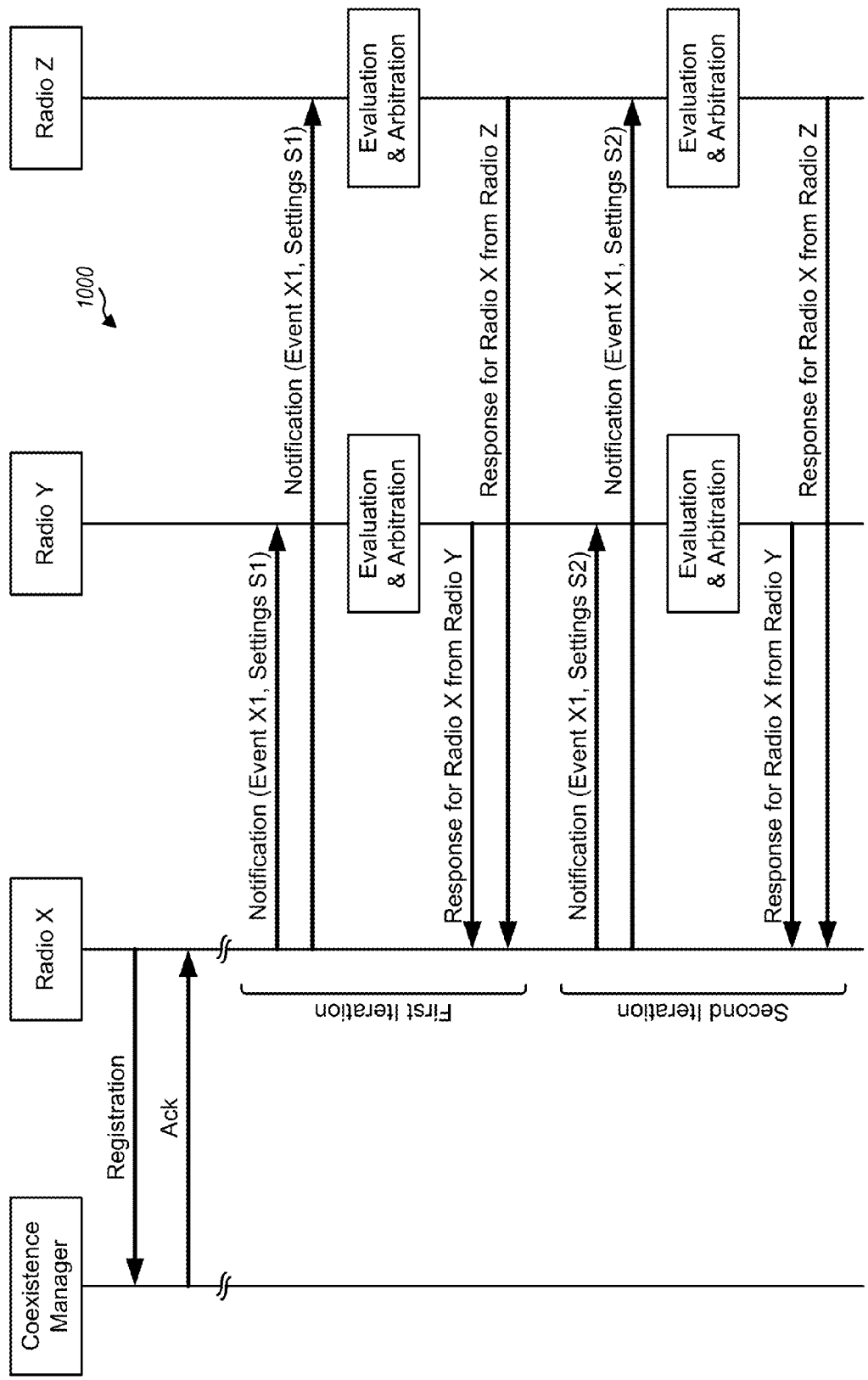
FIG. 10 shows a message flow for decentralized radio coexistence management.

FIG. 10 shows a design of a message flow 1000 for controlling radios for the decentralized architecture shown in FIG. 8B. In general, up to N radios 220 may communicate with each other and with coexistence manager 240. For simplicity, only three radios X, Y and Z are shown in FIG. 10. For clarity, the processing performed by radio X is described below. Similar processing may be performed by each active radio.

In one design, radio X may register itself with coexistence manager 240 via a registration event. The registration may allow coexistence manager 240 to become aware of radio X, to download a pertinent portion of the radio coexistence database to radio X, to allocate communication resources to radio X, etc.

In one design, coexistence manager 240 may determine a radio coexistence database for radio X and may provide this database to radio X. If radio X is a receiver radio, then the database may be referred to as a receive (RX) database. The RX database may include a set of transmitter radios that might collide with receiver radio X, one or more possible resolutions, etc. A resolution may be implemented solely by receiver radio X or may require a change to at least one configurable parameter of a transmitter radio. The RX database for radio X may be provided to radio X and may be used by radio X to control its operation and/or the operation of other radios. If radio X is a transmitter radio, then the database may be referred to as a transmit (TX) database. The TX database may include a set of receiver radios that might collide with transmitter radio X, one or more possible resolutions, etc.

In one design, radio X may send an event request (ER) to other active radios whenever there is planned activity for radio X in an upcoming time period. An event request may also be referred to as an event notification. The event request may convey pertinent information regarding the planned activity of radio X (denoted as "Event X1" in FIG. 10) and may include any of the information described above for message flow 900 such as planned parameter settings for radio X (denoted as "Settings S1" in FIG. 10). The other radios (e.g., radios Y and Z) may receive the event request from radio X and may determine whether the planned activity of radio X will collide with any planned activities for these radios. Each radio may use its RX or TX database to detect for possible collision with the planned activity of radio X. If there is a collision, then the radio may compare the priority of its planned activity with the priority of the planned activity of radio X, which may be provided by the event request. The radio may then send a response, which may include one of the responses shown in Table 1.

TABLE 1

| Response | | Description |
| --- | --- | --- |
| Absolute NACK | aNACK | Planned activity of radio X should not occur. |
| Conditional NACK | cNACK | Planned activity of radio X should not occur unless one or more configurable parameters of radio X are changed. |
| Absolute ACK | aACK | Planned activity of radio X does not collide and can occur. |
| Conditional ACK | cACK | Planned activity of radio X can occur but one or more configurable parameters of radio X should be changed. |

The aACK and aNACK may indicate whether or not the planned activity of radio X can occur. The cNACK may indicate that the planned activity of radio X can occur only if certain changes are made by radio X. The cNACK may result from (i) a collision between a transmit event of radio X and a receive event of another radio having a higher priority and (ii) a resolution to the collision being available. The cNACK may include information for the required changes. For example, radio X may be a transmitter radio and may be required to transmit on a different channel, or at a lower transmit power level, etc. Radio X may be required to implement the change, or the planned activity may not be granted.

The cACK may indicate that the planned activity of radio X can occur but certain changes should be made by radio X. The cACK may result from (i) a collision between a transmit event of radio X and a receive event of another radio having a lower priority and (ii) a resolution to the collision being available. The cACK may include information for the requested change. For example, radio X may be requested to transmit on a different channel, or at a lower transmit power level, etc. Radio X may or may not implement the requested change and may perform the planned activity regardless.

Radio X may receive responses from all other radios for its request. Radio X may perform its planned activity if aACK, cACK and/or cNACK are received from other radios and may implement the changes in any cNACK. Radio X may forgo its planned activity if aNACK is received from any radio. In this case, radio X may change one or more configurable parameters and may repeat the process described above for a second iteration with the new parameter settings (denoted as "Settings S2" in FIG. 10).

There may be cases in which radio X may apply a requested change from one radio, which may then adversely impact the operation of another radio. For example, radio X may be a transmitter radio and may send a request for a transmit activity, which may be received by receiver radios Y and Z. Radio Y may detect a collision with its planned activity and may respond with cACK or cNACK. Radio Z may detect no collision with its planned activity and may send aACK. Radio X may implement the requested change from receiver radio Y to improve the performance of radio Y. Unfortunately, radio X may collide with receiver radio Z and may cause more interference to radio Z as a result of the change.

In one design, the processing described above may be performed iteratively until all collisions can be addressed. For the example described above, transmitter radio X may send another request if it decides to implement a requested change and may stop when only aNACKs or aACKs are received for the planned activity. In another design, a receiver radio may return information that may be used by transmitter radio X to mitigate collision with the receiver radio.

In general, for both the centralized architecture in FIG. 8A and the decentralized architecture in FIG. 8B, the decisions on the operation of radios may be processed in a single iteration or in multiple iterations. Multiple iterations may be especially suitable for the decentralized architecture.

For both the centralized and decentralized architectures, interference between coexisting radios may be mitigated by controlling the operation of one or more radios. The interference mitigation may be based on one or more operational dimensions such as time, frequency, transmit power, code, space, polarization, etc. For time-based mitigation, the time of events of different radios may be adjusted (e.g., delayed and/or advanced) in a coordinated fashion so as to mitigate joint interference. The time adjustments may be limited so that each affected radio can conform to applicable specifications with sufficient margin. For frequency-based mitigation, one or more new frequency channels may be selected for one or more radios to mitigate interference for all radios. For transmit power-based mitigation, the transmit power of one or more transmitter radios may be adjusted so as to reduce joint interference (e.g., based on allowable requirements for receiver radios, not necessarily at sensitivity). The transmit power adjustment may override power control in order to achieve the desired interference mitigation. For code-based mitigation, different codes (e.g., orthogonal codes, scrambling codes, etc.) may be used for different radios to mitigate (e.g., reduce or randomize) interference. For spatial-based mitigation, different radios may be associated with antennas at different physical locations. These antennas may be for different spatial directions and may be selected to reduce interference among the radios. The spatial directions may relate to beam steering or sectorization patterns. The control of these antennas may be achieved via coexistence manager 240 to mitigate joint interference. For polarization-based mitigation, different polarization directions (e.g., vertical and horizontal directions) may be used for different radios to reduce interference. A particular polarization may be obtained for a particular radio by rotating an antenna for the radio, by selecting an antenna or an antenna array that can provide the desired polarization, etc. Interference may also be mitigated based on any one or any combination of the dimensions described above. Interference may also be mitigated in other manners.

Coexistence manager 240 may communicate with radios 220 in various manners to support radio coexistence. The communication may be dependent on whether the centralized architecture in FIG. 8A or the decentralized architecture in FIG. 8B is employed. For clarity, communication between coexistence manager 240 and radios 220 for the centralized architecture is described below.

Figure 11:
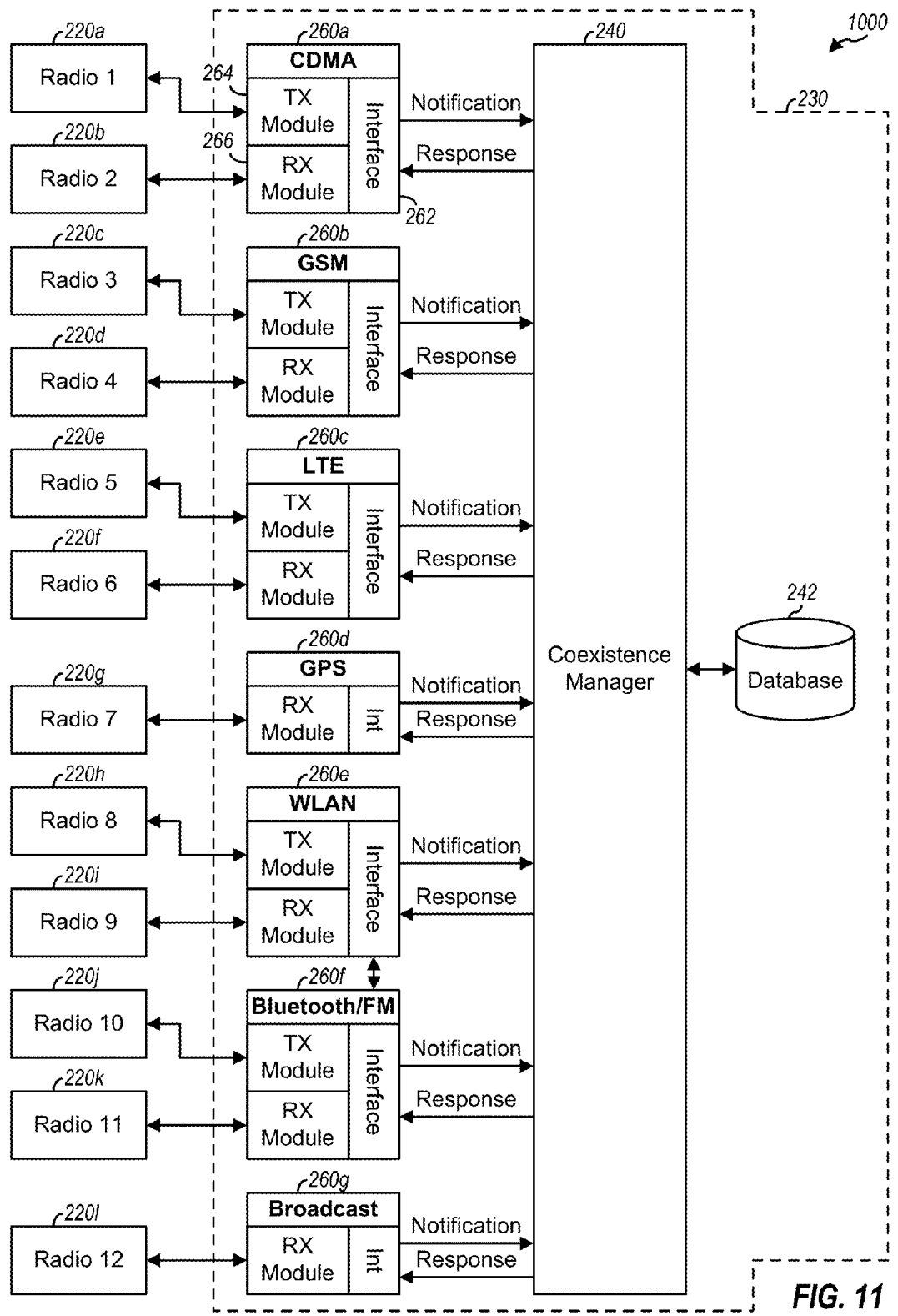
FIG. 11 shows a coexistence manager and multiple processing modules.

FIG. 11 shows an exemplary design of coexistence manager 240 communicating with a number of processing modules 260 for a number of radios 220 supporting different radio technologies. Processing module 260a may support CDMA (e.g., CDMA 1X, WCDMA, and/or some other variant of CDMA) and may communicate with a transmitter radio 220a and a receiver radio 220b. Processing module 260b may support GSM and may communicate with a transmitter radio 220c and a receiver radio 220d. Processing module 260c may support LTE and may communicate with a transmitter radio 220e and a receiver radio 220f. Processing module 260d may support GPS and may communicate with a receiver radio 220g. Processing module 260e may support WLAN and may communicate with a transmitter radio 220h and a receiver radio 220i. Processing module 260f may support Bluetooth/FM and may communicate with a transmitter radio 220j and a receiver radio 220k. Processing module 260g may support broadcast reception and may communicate with a receiver radio 220l.

In the design shown in FIG. 11, coexistence manager 240 and all processing modules 260 may be implemented within digital processor 230. In another design, coexistence manager 240 and processing modules 260a, 260b, 260c and 260d may be implemented within digital processor 230, and remaining processing modules 260e, 260f and 260g may be implemented external to digital processor 230. In general, digital processor 230 may include any number of processing modules 260 for any set of radio technologies.

Processing modules 260a, 260b, 260c, 260e and 260f may each include (i) an interface unit 262 for communicating with coexistence manager 240 and/or other entities, (ii) a TX module 264 supporting the associated transmitter radio, and (iii) an RX module 266 supporting the associated receiver radio. Processing modules 260d and 260g may each include (i) an interface unit 262 for communicating with coexistence manager 240 and/or other entities and (ii) an RX module 266 supporting the associated receiver radio. Each processing module 260 may also perform processing for physical layer (L1), upper layer (L3), and/or other layers. Some processing modules may also communicate directly with one another to mitigate interference and for other functions. For example, WLAN processing module 260e and Bluetooth processing module 260f may communicate directly via a Packet Traffic Arbitration (PTA) interface.

In the design shown in FIG. 11, processing modules 260 may send notifications to coexistence manager 240 for planned activities and may receive responses from coexistence manager 240. Each processing module 260 may control its transmitter radio and/or its receiver radio based on the responses received from coexistence manager 240. For example, a given processing module 260 may control RF parameters, antenna parameters, baseband parameters, protocols and their parameters, etc. The RF parameters may include receiver sensitivity, spurious response, linearity and noise, filtering, traps, insertion loss, adjacent channel rejection, filter selectivity, large signal parameters (e.g., RX blocking, wanted signals and unwanted harmonics, cross-compression, reciprocal mixing, oscillator pulling, etc.), small signal parameters (e.g., out-of-band phase noise of transmitter in receive band, reciprocal mixing, spurious receiver response, etc.), dynamic control mechanisms, transmit power control, digital predistortion (DPD), tunable filters, etc. The antenna parameters may include the number of antennas, diversity scheme, antenna sharing and switching control, physical geometry, antenna to antenna coupling loss, isolation, transmit/receive (T/R) switch, antenna spacing, polarization, etc. The baseband parameters may include interference cancellation algorithms, adaptive notch filter, spectrum sensing, adaptive algorithms, jamming scenarios, adaptive hopping, traffic sensing and detection, cognitive methods to orthogonalize radios, coding and modulation control (back-off), cognitive methods to orthogonalize radios, etc. The protocols and their parameters may include time division multiplex (TDM) coordination, Medium Access Control (MAC) scheduling, temporal solutions, interference avoidance, band selection, deferred transmission, packet timing information, priority information, inhibit transmissions, packet retries, queuing, etc. Other configurable parameters may also be controlled to mitigate interference and achieve good performance.

As an example, a receiver radio may support multiple modes. A first mode may have a higher gain and a lower noise figure and may be selected when jammers are not present and higher sensitivity is desired. A second mode may have a lower gain and a higher IIP3 and may be selected when jammers are present and higher linearity is desired. One mode may be selected for the receiver radio based on the presence or absence of interference from other radios as well as the presence or absence of jammers. Other configurable parameters for the receiver radio may include changes to bias conditions, linearity, frequency plan, filtering, PLL modes, power levels, sampling rates, etc.

A transmitter radio may also include various configurable parameters. For example, the linearity of a power amplifier may be improved (e.g., by increasing the bias current) to reduce adjacent channel power ratio (ACPR) and hence reduce the amount of interference to other receiver radios. Predistortion and other linearization techniques may also be used to lower ACPR and avoid desense of receiver radios. Other configurable parameters for the transmitter radio may include changes to a fractional-N PLL (e.g., changes to divide ratios or reference clock) to reduce or move spurs causing desense, changes to the clock rate (e.g., chipx32, 64, or 96) of digital-to-analog converters (DACs) to reduce DAC image or to avoid receiver bands (e.g., GPS band), etc.

FIG. 11 shows exemplary communication between coexistence manager 240 and processing modules 260 for different radios 220. In general, coexistence manager 240 and processing modules 260 may exchange messages for registration, notifications, responses, and/or other functions via (i) software-based messages passed between different logical entities and/or (ii) hardware-based messages passed via a common bus to which all entities are connected. Direct interface between processing modules 260 (e.g., the PTA interface between WLAN and Bluetooth processing modules 260e and 260f) may also be implemented with, and absorbed by, messaging via the common bus.

Coexistence manager 240 may support an arbitrary collection of radios. Each radio may be responsible for controlling its configurable parameters to mitigate interference caused or observed by that radio. Each radio may be associated with a radio controller that may receive responses for that radio and set the configurable parameters accordingly. The radio controller may also be referred to as a Notification Handler (NH), a host RF driver (DRV), etc.

Figure 12:
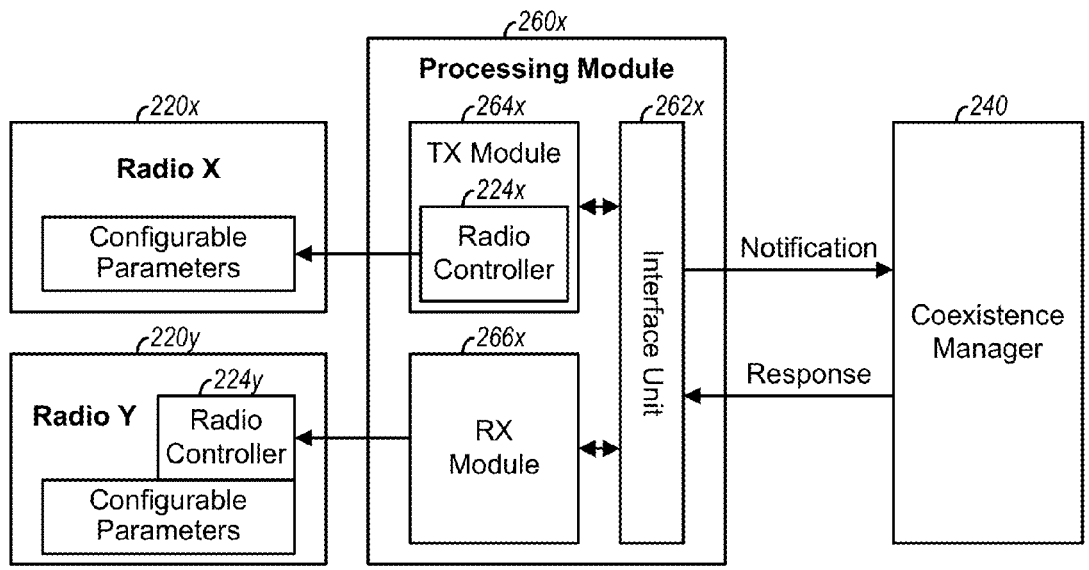
FIG. 12 shows two designs of radio controllers for radios.

FIG. 12 shows two designs of radio controllers for radios. A processing module 260x for a given radio technology may include an interface unit 262x to exchange messages with coexistence manager 240, a TX module 264x supporting an associated transmitter radio 220x, and an RX module 266x supporting an associated receiver radio 220y.

For a first design, a radio controller may reside outside of an associated radio (e.g., within a processing module) and may set the configurable parameters of the radio. For a second design, a radio controller may reside within an associated radio and may set the configurable parameters of the radio. In the example shown in FIG. 12, a radio controller 224x is implemented with the first design and resides within TX module 264x. Radio controller 224x may receive responses from coexistence manager 240 for radio 220x and may set the configurable parameters for radio 220x in accordance with the received responses. A radio controller 224y is implemented with the second design and resides within radio 220y. Processing module 260x may receive responses from coexistence manager 240 for radio 220y and may forward the responses to radio controller 224y. Radio controller 224y may set the configurable parameters for radio 220y in accordance with the received responses.

Wireless device 110 may include a number of antennas to support the N radios 220. For example, wireless device 110 may include multiple antennas for WWAN systems for different bands, one or more antennas for GPS, one or more antennas for broadcast systems, one or more antennas for WLAN systems and Bluetooth, one or more antennas for FM systems, etc. Having one or more dedicated antennas for each radio may result in a large number of antennas for all N radios.

Figure 13A:
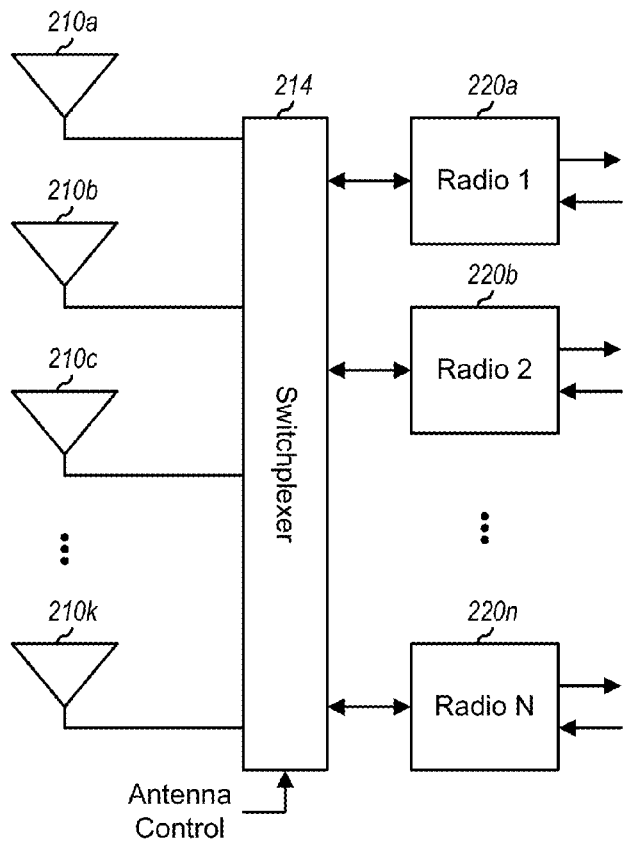
FIGS. 13A and 13B show two designs of sharing antennas for radios.

FIG. 13A shows a design of supporting N radios 220 with shared antennas. Wireless device 110 may include a set of K antennas 210a through 210k that can support N radios 220a through 220n, where K may be any suitable integer value. For example, wireless device 110 may include two antennas for WWAN, WLAN, Bluetooth and GPS and one antenna for broadcast. A switchplexer 214 may couple to the K antennas 210 and also to the N radios 220. Switchplexer 214 may couple each radio 220 to one or more antennas 210 based on an antenna control. Switchplexer 214 may allocate the K antennas 210 to one or more active radios depending on which radios are active. For example, multiple antennas may be allocated to WWAN for receive diversity during a voice or data connection. These antennas may be switched to WLAN for receive diversity when WWAN is not in use or when dictated by requirements. The K available antennas may be configured for receive diversity, selection diversity, multiple-input multiple-output (MIMO), or beamforming for any of the radios. The operation of switchplexer 214 may be controlled by coexistence manager 240 and/or some other entity.

Figure 13B:
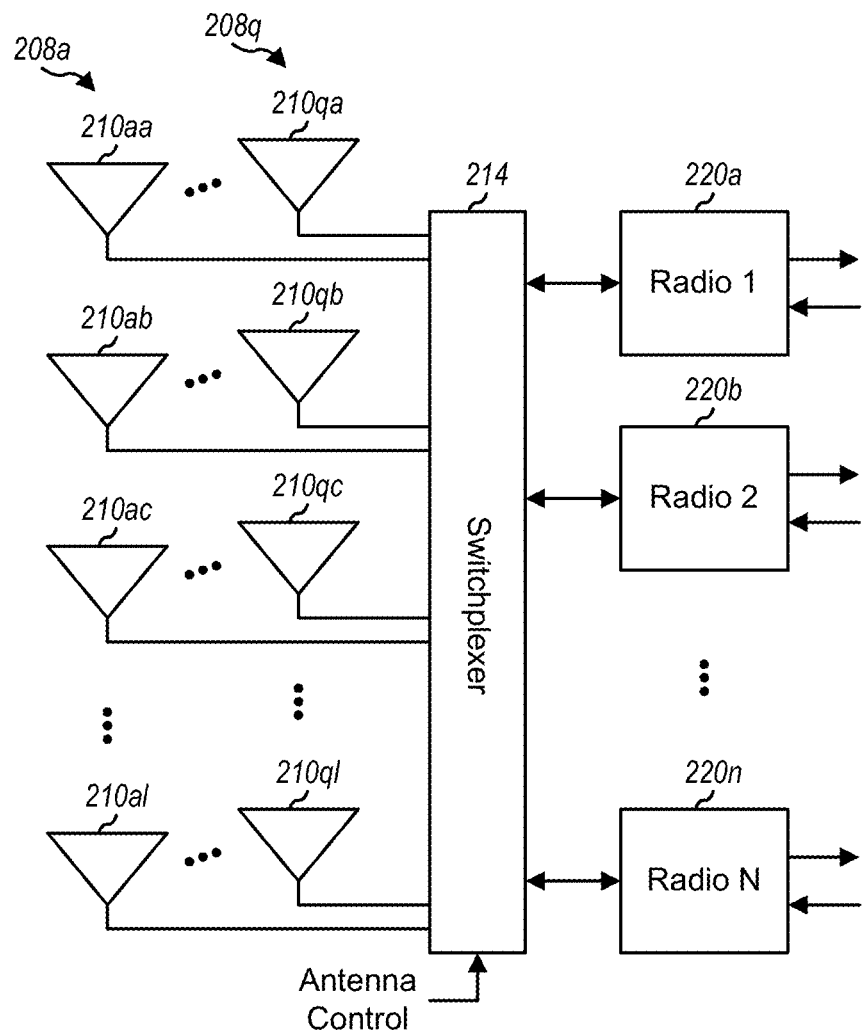

FIG. 13B shows a design of supporting N radios 220 with one or more antenna arrays. Wireless device 110 may include Q antenna arrays 208a through 208q, where Q≥1. The first antenna array 208a may include L antennas 210aa through 210al, where L>1. Each remaining antenna array may include the same or different number of antennas. Switchplexer 214 may couple to the Q antenna arrays 208 and also to the N radios 220. Switchplexer 214 may couple each radio 220 to one or more antenna arrays 208 based on an antenna control. The phases of the antennas in a selected antenna array may be controlled to achieve steering, beamforming, etc. The operation of switchplexer 214 may be controlled by coexistence manager 240 and/or some other entity.

FIG. 14 shows a design of a process 1400 for controlling operation of radios. Inputs from one or more radios among multiple radios operating concurrently may be received (block 1412). Controls for at least one radio among the multiple radios may be determined based on the received inputs to mitigate interference caused by or observed by each of the at least one radio (block 1414). The controls for the at least one radio may be determined once or iteratively. The controls may be sent to the at least one radio (block 1416). Each radio may operate in accordance with the control sent to that radio.

The inputs from the radios may comprise various types of information. In one design, an input indicative of a planned operating state of a radio in an upcoming time interval may be received. In another design, an input indicative of planned activity of the radio in the upcoming time interval may be received. The input from the radio may also comprise other information indicative of planned operation of the radio.

In one design of block 1414, the controls for the at least one radio may be determined based on a database of information on performance versus operating states for different combinations of radios. The database may store the information in the form of a color chart or in some other format. At least one operating state for the at least one radio may be selected based on the database to obtain acceptable performance for the at least one radio.

The controls for the at least one radio may be determined based on various operational dimensions. In one design, the controls may adjust the time of at least one event for the at least one radio to mitigate interference. In another design, the controls may adjust the transmit power of the at least one radio to mitigate interference. In yet another design, the controls may adjust at least one frequency channel for the at least one radio to mitigate interference. The controls may also be determined based on other operational dimensions.

The controls sent to the at least one radio may comprise various types of information. In one design, a control indicative of a selected operating state for a radio in an upcoming interval may be sent to the radio. The radio may then operate in the selected operating state. In another design, a control to set at least one configurable parameter of the radio may be sent to the radio. The configurable parameter(s) may comprise an amplifier, a filter, a transmit power level, an antenna, an antenna array, etc., or a combination thereof.

In one design, the inputs from the one or more radios may be received via software commands. The controls may also be sent to the at least one radio via software commands. In another design, the inputs from the one or more radios may be received via a hardware bus. The controls may also be sent to the at least one radio via the hardware bus. In general, the inputs and controls may be sent using any suitable communication means.

In one design, for a centralized architecture, process 1400 may be performed by a coexistence manager designated to control the operation of all of the multiple radios. The coexistence manager may send a control to a controller for a radio, and the controller may set at least one configurable parameter of the radio in accordance with the control. In another design, for a decentralized architecture, process 1400 may be performed by a controller for one of the multiple radios. For both the centralized and decentralized architectures, the coexistence manager and the controller may be co-located on the same integrated circuit or processor, e.g., as shown in FIG. 12. Alternatively, the controller may be located within the radio, e.g., as also shown in FIG. 12.

In one design, the coexistence manager may communicate with a radio for registration of the radio. The coexistence manager may obtain information (e.g., radio type, frequency channels, configurable parameters, etc.) used to control operation of the radio via the registration. The coexistence manager may also determine a portion of the database for controlling the operation of the radio. The portion of the database may be loaded from external memory (e.g., memory 252 in FIG. 2) to internal memory (e.g., memory 244). For the centralized architecture, the loaded portion may be part of the database accessible by the coexistence manager (e.g., database 242 in FIGS. 2 and 8A). For the decentralized architecture, the loaded portion may be part of a database accessible by the radio (e.g., database 226 in FIG. 8B). Other actions may also be performed in conjunction with the registration. For example, the priority of the radio may be determined and used subsequently.

In general, the multiple radios may include any number of radios for any number of radio technologies, e.g., at least three radios for at least three different radio technologies. The multiple radios may include at least one transmitter radio and at least one receiver radio. The multiple radios may also include radios of other types. For example, the multiple radios may include (i) a software defined radio (SDR) supporting multiple radio technologies, (ii) a cognitive radio configurable to search for a clear frequency channel and to operate on the clear frequency channel, (iii) a radio emitting interference without supporting wireless communication, and/or (iv) other types of radios. The multiple radios may be located within a single device (e.g., as shown in FIG. 2) or may be located in multiple devices (e.g., as shown in FIG. 3). The at least one radio to which the controls are sent may include a single radio for a single radio technology or more than one radio for more than one radio technology.

FIG. 15 shows a design of a process 1500 for controlling operation of radios. One or more notifications may be received from one or more radios among multiple radios operating concurrently (block 1512). Each notification may indicate planned activity of a corresponding radio. Proposed operation of at least one radio among the multiple radios may be determined based on the one or more notifications to mitigate interference caused by or observed by each of the at least one radio (block 1514). At least one response may be sent to the at least one radio, with each response conveying the proposed operation of a corresponding radio (block 1516). Each radio may operate in accordance with its proposed operation.

In one design, the one or more notifications may be sent synchronously by the one or more radios. Blocks 1512, 1514 and 1516 may be performed in each time interval of a particular duration. For example, the one or more notifications may be received during a first part of a time interval, the proposed operation of the at least one radio may be determined during a second part of the time interval, and the at least one response may be sent during a third part of the time interval. In another design, the one or more notifications may be sent asynchronously by the one or more radios. The at least one response may also be sent asynchronously to the at least one radio. For both designs, a notification may be sent by a corresponding radio periodically, or when there is a change in planned activity of the radio, or based on some other trigger. A response may be sent to a corresponding radio when a notification is received from the radio, when there is a change in proposed operation of the radio, or based on some other trigger.

FIG. 16 shows a design of a process 1600 for controlling operation of radios. At least one first radio on a first device and at least one second radio on a second device may be identified (block 1612). The first and second radios may operate concurrently. Operation of the at least one first radio on the first device may be controlled to mitigate interference to the at least one second radio on the second device (block 1614). In one design, at least one setting for at least one configurable parameter of the at least one first radio may be determined. The performance of the at least one second radio may be determined based on the at least one setting. The at least one setting may be retained if the performance if acceptable and may be changed if the performance is unacceptable. The at least one configurable parameter may comprise a frequency channel, a transmit power level, an antenna, an antenna array, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting wireless communication, comprising:
  receiving notifications from one or more radios among multiple radios operating concurrently in each decision period when the one or more radios have planned activity in an upcoming time interval;
  determining controls for at least one radio among the multiple radios based on the received notifications to mitigate interference in the upcoming time interval between the at least one radio and the one or more radios having the planned activity, wherein determining controls for the at least one radio comprises:
    determining at least one setting for at least one configurable parameter of the at least one radio,
    determining performance of another radio from the one or more radios having the planned activity based on the at least one setting,
    retaining the at least one setting when the determined performance is acceptable, and
    changing the at least one setting when the determined performance is unacceptable; and
  sending the controls to the at least one radio.

2. The method of claim 1, wherein the received notifications comprise information indicative of a planned operating state of the one or more radios in the upcoming time interval.

3. The method of claim 1, wherein the received notifications comprise information indicative of the planned activity of the one or more radios in the upcoming time interval.

4. The method of claim 1, wherein the determining the controls comprises determining the controls for the at least one radio based on a database of information on performance versus operating states for different combinations of radios.

5. The method of claim 4, wherein the determining the controls comprises selecting at least one operating state for the at least one radio based on the database to obtain acceptable performance for the at least one radio.

6. The method of claim 1, wherein the determining the controls comprises determining the controls to adjust time of at least one event for the at least one radio to mitigate the interference in the upcoming time interval.

7. The method of claim 1, wherein the determining the controls comprises determining the controls to adjust transmit power of the at least one radio to mitigate the interference in the upcoming time interval.

8. The method of claim 1, wherein the determining the controls comprises determining the controls to adjust at least one frequency channel for the at least one radio to mitigate the interference in the upcoming time interval,
  sending the controls to the at least one radio.

9. The method of claim 1, wherein the controls sent to the at least one radio indicate a selected operating state for the at least one radio in the upcoming interval, and wherein the at least one radio operates in the selected operating state in the upcoming time interval to reduce the interference to the one or more radios having the planned activity or to combat the interference from the one or more radios having the planned activity.

10. The method of claim 1, wherein the controls sent to the at least one radio set at least one configurable parameter of the at least one radio in the upcoming time interval.

11. The method of claim 1, wherein the controls sent to the at least one radio comprise a configurable parameter setting for one or more of an amplifier, a filter, a transmit power level, an antenna, an antenna array, a frequency channel, or a traffic channel of the at least one radio in the upcoming time interval.

12. The method of claim 1, wherein the sending the controls comprises sending the controls from a coexistence manager to a controller for the at least one radio, the controller being co-located with the coexistence manager on an integrated circuit and setting at least one configurable parameter of the at least one radio in the upcoming time interval in accordance with the controls.

13. The method of claim 1, wherein the sending the controls comprises sending the controls from a coexistence manager to a controller for the at least one radio, the controller being located within the radio and setting at least one configurable parameter of the at least one radio in the upcoming time interval in accordance with the controls.

14. The method of claim 1, wherein the receiving, determining, and sending are performed by a coexistence manager designated to control operation of all of the multiple radios.

15. The method of claim 1, wherein the receiving, determining, and sending are performed by a controller for one of the multiple radios.

16. The method of claim 1, wherein the controls for the at least one radio are determined iteratively.

17. The method of claim 1, wherein the notifications from the one or more radios are received via software messages, and wherein the controls are sent to the at least one radio via software messages.

18. The method of claim 1, wherein the notifications from the
  one or more radios are received via a hardware bus, and wherein the controls are sent to the at least one radio via the hardware bus.

19. The method of claim 1, further comprising:
  communicating with a radio for registration of the radio; and
  obtaining information used to control operation of the radio via the registration.

20. The method of claim 19, further comprising:
  determining a portion of a database for controlling the operation of the radio; and
  loading the portion of the database from external memory to internal memory to obtain the information used to control the operation of the radio.

21. The method of claim 1, wherein the multiple radios comprise at least one transmitter radio and at least one receiver radio.

22. The method of claim 1, wherein the at least one radio comprises a single radio for a single radio technology.

23. The method of claim 1, wherein the multiple radios comprise at least two radios for at least two different radio technologies.

24. The method of claim 1, wherein the multiple radios comprise a software defined radio (SDR) supporting multiple radio technologies.

25. The method of claim 1, wherein the multiple radios comprise a cognitive radio configurable to search for a clear frequency channel and to operate on the clear frequency channel.

26. The method of claim 1, wherein the multiple radios comprise a unit emitting one or more of noise or interference without supporting wireless communication.

27. The method of claim 1, wherein the multiple radios are located within a single device.

28. The method of claim 1, wherein the multiple radios are located in multiple devices.

29. An apparatus supporting wireless communication, comprising:
    means for receiving notifications from one or more radios among multiple radios operating concurrently in each decision period when the one or more radios have planned activity in an upcoming time interval;
    means for determining controls for at least one radio among the multiple radios based on the received inputs notifications to mitigate interference in the upcoming time interval between the at least one radio and the one or more radios having the planned activity, wherein the means for determining controls for the at least one radio comprises:
        means for determining at least one setting for at least one configurable parameter of the at least one radio,
        means for determining performance of another radio from the one or more radios having the planned activity based on the at least one setting,
        means for retaining the at least one setting when the determined performance is acceptable, and
        means for changing the at least one setting when the determined performance is unacceptable; and
    means for sending the controls to the at least one radio.

30. The apparatus of claim 29, wherein received notifications comprise information indicative of one or more of a planned operating state or the planned activity of the one or more radios in the upcoming time interval.

31. The apparatus of claim 29, wherein the means for determining the controls comprises means for determining the controls for the at least one radio based on a database of information on performance versus operating states for different combinations of radios.

32. The apparatus of claim 31, wherein the means for determining the controls comprises means for selecting at least one operating state for the at least one radio based on the database to obtain acceptable performance for the at least one radio.

33. The apparatus of claim 29, wherein the controls sent to the at least one radio indicate one or more of a selected operating state or at least one configurable parameter setting for the at least one radio in the upcoming interval, and wherein the at least one radio operates in accordance with the selected operating state or the at least one configurable parameter setting in the upcoming time interval to reduce the interference to the one or more radios having the planned activity or to combat the interference from the one or more radios having the planned activity.

34. An apparatus supporting wireless communication, comprising:
    at least one processor configured to receive notifications from one or more radios among multiple radios operating concurrently in each decision period when the one or more radios have planned activity in an upcoming time interval, to determine controls for at least one radio among the multiple radios based on the received notifications to mitigate interference in the upcoming time interval between the at least one radio and the one or more radios having the planned activity, and to send the controls to the at least one radio, wherein to determine controls for the at least one radio comprises:
        determining at least one setting for at least one configurable parameter of the at least one radio,
        determining performance of another radio from the one or more radios having the planned activity based on the at least one setting,
        retaining the at least one setting when the determined performance is acceptable, and
        changing the at least one setting when the determined performance is unacceptable.

35. The apparatus of claim 34, wherein the received notifications comprise information indicative of one or more of a planned operating state or the planned activity of the one or more radios in the upcoming time interval.

36. The apparatus of claim 34, wherein the at least one processor is configured to determine the controls for the at least one radio based on a database of information on performance versus operating states for different combinations of radios.

37. The apparatus of claim 36, wherein the at least one processor is configured to select at least one operating state for the at least one radio based on the database to obtain acceptable performance for the at least one radio.

38. The apparatus of claim 34, wherein the controls sent to the at least one radio indicate one or more of a selected operating state or at least one configurable parameter setting for the at least one radio in the upcoming interval, and wherein the at least one radio operates in accordance with the selected operating state or the at least one configurable parameter setting in the upcoming time interval to reduce the interference to the one or more radios having the planned activity or to combat the interference from the one or more radios having the planned activity.

39. A computer program product, comprising:
    a non-transitory computer-readable medium comprising:
        code for causing at least one computer to receive notifications from one or more radios among multiple radios operating concurrently in each decision period when the one or more radios have planned activity in an upcoming time interval,
        code for causing the at least one computer to determine controls for at least one radio among the multiple radios based on the received notifications to mitigate interference in the upcoming time interval between the at least one radio and the one or more radios having the planned activity, wherein the code for causing the at least one computer to determine controls comprises:
            code for determining at least one setting for at least one configurable parameter of the at least one radio,
            code for determining performance of another radio from the one or more radios having the planned activity based on the at least one setting,
            code for retaining the at least one setting when the determined performance is acceptable, and
            code for changing the at least one setting when the determined performance is unacceptable; and code for causing the at least one computer to send the controls to the at least one radio.

40. A method of supporting wireless communication, comprising:
receiving one or more notifications from one or more radios among multiple radios operating concurrently in each decision period when the one or more radios have planned activity in an upcoming time interval, wherein the one or more notifications each indicate the planned activity of the corresponding one or more radios in the upcoming time interval;
determining proposed operation of at least one radio among the multiple radios based on the one or more notifications to mitigate interference in the upcoming time interval between the at least one radio and the one or more radios having the planned activity, wherein determining proposed operation of the at least one radio comprises:
determining at least one setting for at least one configurable parameter of the at least one radio,
determining performance of another radio from the one or more radios having the planned activity based on the at least one setting,
retaining the at least one setting when the determined performance is acceptable, and
changing the at least one setting when the determined performance is unacceptable; and
sending at least one response to the at least one radio, wherein the at least one response conveys the proposed operation of the at least one radio in the upcoming time interval.

41. The method of claim 40, wherein the one or more notifications are sent synchronously by the one or more radios in time slots assigned to each of the one or more radios in each decision period.

42. The method of claim 40, further comprising:
performing the receiving, determining, and sending in different intervals of each decision period.

43. The method of claim 40, wherein the proposed operation of the at least one radio is determined during a first interval of each decision period and the at least one response is sent during a second interval of each decision period.

44. The method of claim 40, wherein the one or more notifications are sent asynchronously by the one or more radios in response to the planned activity in the upcoming time interval triggering the one or more notifications.

45. The method of claim 40, wherein the proposed operation of the at least one radio is determined and at least one response is sent to the at least one radio asynchronously in response to receiving the one or more notifications that indicate the planned activity in the upcoming time interval.

46. The method of claim 40, wherein the one or more notifications include a notification sent by a corresponding radio to indicate a change in the planned activity of the corresponding radio in the upcoming time interval.

47. The method of claim 45, wherein the at least one response is sent to the at least one radio to convey a change in the proposed operation of the at least one radio in the upcoming time interval.

48. An apparatus supporting wireless communication, comprising:
means for receiving one or more notifications from one or more radios among multiple radios operating concurrently in each decision period when the one or more radios have planned activity in an upcoming time interval, wherein the one or more notifications each indicate the planned activity of the corresponding one or more radios in the upcoming time interval;
means for determining proposed operation of at least one radio among the multiple radios based on the one or more notifications to mitigate interference in the upcoming time interval between the at least one radio and the one or more radios having the planned activity, wherein the means for determining proposed operation of the at least one radio comprises:
means for determining at least one setting for at least one configured parameter of the at least one radio,
means for determining performance of another radio from the one or more radios having the planned activity based on the at least one setting,
means for retaining the at least one setting when the determined performance is acceptable, and
means for changing the at least one setting when the determined performance is unacceptable; and
means for sending at least one response to the at least one radio, wherein the at least one response conveys the proposed operation of the at least one radio in the upcoming time interval.

49. The method of claim 48, wherein the one or more notifications are sent synchronously by the one or more radios in time slots assigned to each of the one or more radios in each decision period.

50. The method of claim 48, wherein the one or more notifications are sent asynchronously by the one or more radios in response to the planned activity in the upcoming time interval triggering the one or more notifications.

51. A method of supporting wireless communication, comprising: identifying at least one first radio on a first device and at least one second radio on a second device, the at least one first radio and the at least one second radio operating concurrently; receiving a notification from the at least one first radio on the first device in each decision period when the at least one first radio has planned activity in an upcoming time interval; and controlling operation of the at least one first radio on the first device in each decision period to reduce interference to or combat interference from the at least one second radio on the second device in the upcoming time interval, wherein the controlling the operation of the at least one first radio comprises: determining at least one setting for the at least one configurable parameter of the at least one radio, determining performance of another radio from the one or more radios having the planned activity based on the at least one setting, retaining the at least one setting when the determined performance is acceptable, and changing the at least one setting when the determined performance is unacceptable.

52. The method of claim 51, wherein the at least one setting for the at least one configurable parameter relates to one or more of a frequency channel, a transmit power level, a traffic channel, an antenna, an antenna array, an amplifier, or a filter of the at least one first radio.

53. An apparatus supporting wireless communication, comprising:
means for identifying at least one first radio on a first device and at least one second radio on a second device, the at least one first radio and the at least one second radio operating concurrently; and
means for receiving a notification from the at least one first radio on the first device in each decision period when the at least one first radio has planned activity in an upcoming time interval; and
means for controlling operation of the at least one first radio on the first device in each decision period to reduce interference to or combat interference from the at least one second radio on the second device in the upcoming time interval, wherein the means for controlling the operation of the at least one first radio comprises:
means for determining at least one setting for at least one configurable parameter of the at least one first radio,
means for determining performance of the at least one second radio based on the at least one setting,
means for retaining the at least one setting when the determined performance if acceptable, and
means for changing the at least one setting when the determined performance is unacceptable.

* * * * *